US012778076B2

(12) United States Patent
Northrop et al.

(10) Patent No.: US 12,778,076 B2
(45) Date of Patent: Nov. 3, 2026

(54) GRAVITY FEEDER AND WATERER

(71) Applicant: DOSKOCIL MANUFACTURING COMPANY, INC., Arlington, TX (US)

(72) Inventors: Melaney Northrop, Mansfield, TX (US); Michael Harper, Fort Worth, TX (US); Matthew Dubose Kidd, Fort Worth, TX (US); Ryan Paxson, Elk Rapids, MI (US)

(73) Assignee: Doskocil Manufacturing Company, Inc., Arlington, TX (US)

( * ) Notice: Subject to any disclaimer, the term of this patent is extended or adjusted under 35 U.S.C. 154(b) by 14 days.

(21) Appl. No.: 19/170,957

(22) Filed: Apr. 4, 2025

(65) Prior Publication Data

US 2025/0311695 A1 Oct. 9, 2025

Related U.S. Application Data

(60) Provisional application No. 63/575,317, filed on Apr. 5, 2024.

(51) Int. Cl.
*A01K 5/01* (2006.01)
*A01K 5/02* (2006.01)
*A01K 7/02* (2006.01)

(52) U.S. Cl.
CPC .......... *A01K 5/0114* (2013.01); *A01K 5/0225* (2013.01); *A01K 7/02* (2013.01)

(58) Field of Classification Search
CPC ...... A01K 5/0114; A01K 5/0225; A01K 7/02; A01K 5/0216
See application file for complete search history.

(56) References Cited

U.S. PATENT DOCUMENTS

| | | | | | |
|---|---|---|---|---|---|
| 3,730,141 | A * | 5/1973 | Manning | A01K 5/0114 119/51.5 |
| 4,947,796 | A * | 8/1990 | Robinette | A01K 5/0114 119/61.5 |
| D659,298 | S | 5/2012 | Obeyesekere | |
| D983,463 | S * | 4/2023 | Chen | D30/122 |
| D989,409 | S * | 6/2023 | Long | D30/132 |
| D1,017,916 | S * | 3/2024 | Cen | D30/122 |

(Continued)

FOREIGN PATENT DOCUMENTS

| | | | | |
|---|---|---|---|---|
| GB | 6 235 388 | 10/2022 | | |
| WO | WO-2025085927 A1 * | 4/2025 | | A01K 7/00 |

OTHER PUBLICATIONS

Pet Waterer and Feeder Assemblies (Year: 2025).*

(Continued)

*Primary Examiner* — Yvonne R Abbott-Lewis
(74) *Attorney, Agent, or Firm* — Foley & Lardner LLP

(57) ABSTRACT

A feeder and waterer assembly include a feeder and waterer. The feeder includes a feeder base and a feeder bottle coupled to the feeder base. The feeder bottle is configured to provide gravity fed solid food to the feeder base. The waterer includes a waterer base and a waterer bottle. The feeder bottle is coupled to the waterer base. The waterer bottle is coupled to the waterer base and the feeder base. The waterer bottle is configured to provide gravity fed water to the waterer base. The waterer base and the feeder base are interchangeable and the feeder bottle and the waterer bottle are substantially similar dimensions.

20 Claims, 19 Drawing Sheets

(56) References Cited

U.S. PATENT DOCUMENTS

| | | | | | |
|---|---|---|---|---|---|
| D1,065,708 | S * | 3/2025 | Wang | D30/130 |
| D1,080,080 | S * | 6/2025 | Zhang | D30/131 |
| D1,091,965 | S | 9/2025 | Hu | |
| D1,105,638 | S | 12/2025 | Zhang | |
| 2006/0196433 | A1 * | 9/2006 | Ness | A01K 5/0114 119/52.1 |
| 2025/0311695 | A1 | 10/2025 | Northrop et al. | |

OTHER PUBLICATIONS

67i_Automatic Gravity Pet Water Dispenser Self-Dispensing Gravity_ Mar. 3, 2023, retrieved Jan. 12, 2026, from Internet _https://www.amazon.ca/67i-Automatic-Gravity-Dispenser-Self-Dispensing/dp/BOBX8MDSKY (4 pages).
Ckuakiwu_Automatic Dog Food Dispenser Mar. 25, 2024 Retrieved from Internet _ https://wwwamazon.ca/Automatic-Dispenser-Detachable-Feeder-Medium/dp/BOCYWWPCGM?th=1 (2 pages).
Darrengoing_ Dec. 2, 2022, retrieved Jan. 12, 2026 https://WWW.ubuy.com.pr/en/product/8J3NCXQLO-3-8I-auto-feeder-for-dog-cat-food-and-Water-dispenser-set-for-most-pets-gravity-dispenser-large-dog-cat-puppy-kitten?srsltid= AfmBOooduUhISDWoCTiK9LLSWWW95KVaML1OWJbTgxOWGVHkoHlc (3 pages).
Kacoomi_Gravity Automatic Dog-Cat Feed Water Dispenser Set—Aug. 31, 2021 from Internet_https://www.amazon.com/Automatic-Dispenser-Gravity-Waterer-Capacity/dp/ BO B818VXW1/ref=sr_1_16?th=1 (1 pages).
NeoSter_Automatic Dog Cat Feeder and Water Dispenser—Sep. 11, 2022, Retrieved from Internet_https://www.amazon.sa/-/en/NeoSter-Automatic-Dispenser-Capacity-dispenser/dp/BOBB21CJ K9?th=1 (4 pages).
Tokenkuko_Automatic Pet Food Water Dispenser Set—Oct. 14, 2024 Retrieved from Internet—https:// WWW.dhgate.com/goods/1034734666.html(3 pages).
Vibrant Life_Gravity Pet Feeder for Dogs and Cats—posted Oct. 2, 2019 Retrieved from Internet_https:// business.walmart.com/reviews/product/112040880lter=5&entryPoint=seeAllReviewsStarRating&page=20 (3 pages).
YMINA_Automatic Cat Feeder Pet Feeder set Jun. 19, 2022, retrieved Jan. 12, 2026, Retrieved from Internet _ https:// WWW.amazon.co.uk/YMINA-Automatic-Feeder-Dispenser-Accessories/dp/8093GBRB2T (3 pages).

* cited by examiner

GRAVITY FEEDER AND WATERER

CROSS-REFERENCE TO RELATED PATENT APPLICATION

This application claims the benefit of and priority to U.S. Provisional Patent Application 63/575,317, filed on Apr. 5, 2024, which is incorporated herein by reference in its entirety.

BACKGROUND

Pets are typically provided with food and water by putting the food and water into separate open bowls. The feeders and waterers may be packaged and shipped to consumers. Feeders and waterers may be designed and manufactured separately using a different mold for each component of the feeder and waterer.

SUMMARY

In some embodiments, a feeder and waterer assembly include a feeder and waterer. The feeder includes a feeder base and a feeder bottle coupled to the feeder base. The feeder bottle is configured to provide gravity fed solid food to the feeder base. The waterer includes a waterer base and a waterer bottle. The feeder bottle is coupled to the waterer base. The waterer bottle is coupled to the waterer base and the feeder base. The waterer bottle is configured to provide gravity fed water to the waterer base. The waterer base and the feeder base are interchangeable and the feeder bottle and the waterer bottle are substantially similar dimensions.

In another embodiments, a feeder and waterer assembly includes a base, a feeder bottle, and a waterer bottle. The base includes a bowl, a stand, and a ramp extending between the bowl and the stand. A lower end of the waterer bottle is dimensioned to couple to the stand. The waterer bottle is configured to provide gravity fed water into the bowl. A lower end of the feeder bottle is dimensioned to couple to the stand. An upper end of the feeder bottle includes a lid. The feeder bottle is configured to provide gravity fed solid food into the bowl. The upper end of the feeder bottle and an upper end of the waterer bottle have substantially similar dimensions, such that each of the upper ends of the waterer bottle and the feeder bottle are capable of being received within the bowl.

In yet another embodiment a feeder and waterer assembly include a feeder base, a waterer base, a waterer bottle, and a feeder bottle. The feeder base and the waterer base are substantially identical. Each of the feeder base and the waterer base include a stand, a bowl, and a ramp extending between the stand and the bowl. The ramp is configured to direct food or water from the stand to the bowl. The feeder bottle is substantially identical to the waterer bottle. The waterer bottle is configured to provide gravity fed water to the bowl of the waterer base. The feeder bottle is configured to provide gravity fed solid food to the bowl of the feeder base. Each of the waterer bottle and the feeder bottle include an upper end, a lower end opposite the upper end, and a plurality of bottle sides extending between the upper end and the lower end of the respective bottle. Each of the bottle sides define an upper indentation, and a lower indentation substantially parallel to and offset from the upper indentation. The upper indentation and the lower indentation are configured to reduce movement of the bottle sides when the water is dispensed. The upper end of the feeder bottle includes a lid. The lower end of the feeder bottle includes a ring insert at least partially extending within the feeder bottle. The lower end of the waterer bottle includes a waterer cap assembly configured to prevent the water from spilling from the waterer bottle when coupling the waterer bottle to the waterer base. The upper ends of the feeder bottle and the waterer bottle are dimensioned to couple interchangeably with the bowl of the feeder base or the bowl of the waterer base. The lower ends of the feeder bottle and the waterer bottle are dimensioned to couple interchangeably with the stand of the feeder base or the stand of the waterer base.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations for providing a feeder and a water assembly. The various concepts introduced above and discussed in greater detail below may be implemented in a number of ways, as the described concepts are not limited to any particular manner of implementation. Examples of specific implementations and applications are provided primarily for illustrative purposes.

I. Overview

FIGS. 1-11 show a feeder and waterer that use parts that are interchangeable such as a bowl with a unitarily formed base portion, the base portion including an upper opening that receives and supports a lower end of a bottle, the bowl and base portion for the waterer is identical to the bowl and base portion of the feeder, and the bottle of the waterer is identical to the bottle of the feeder except that the bottle of the feeder can include an opening at its upper end that receives a removable lid.

Figure 1:
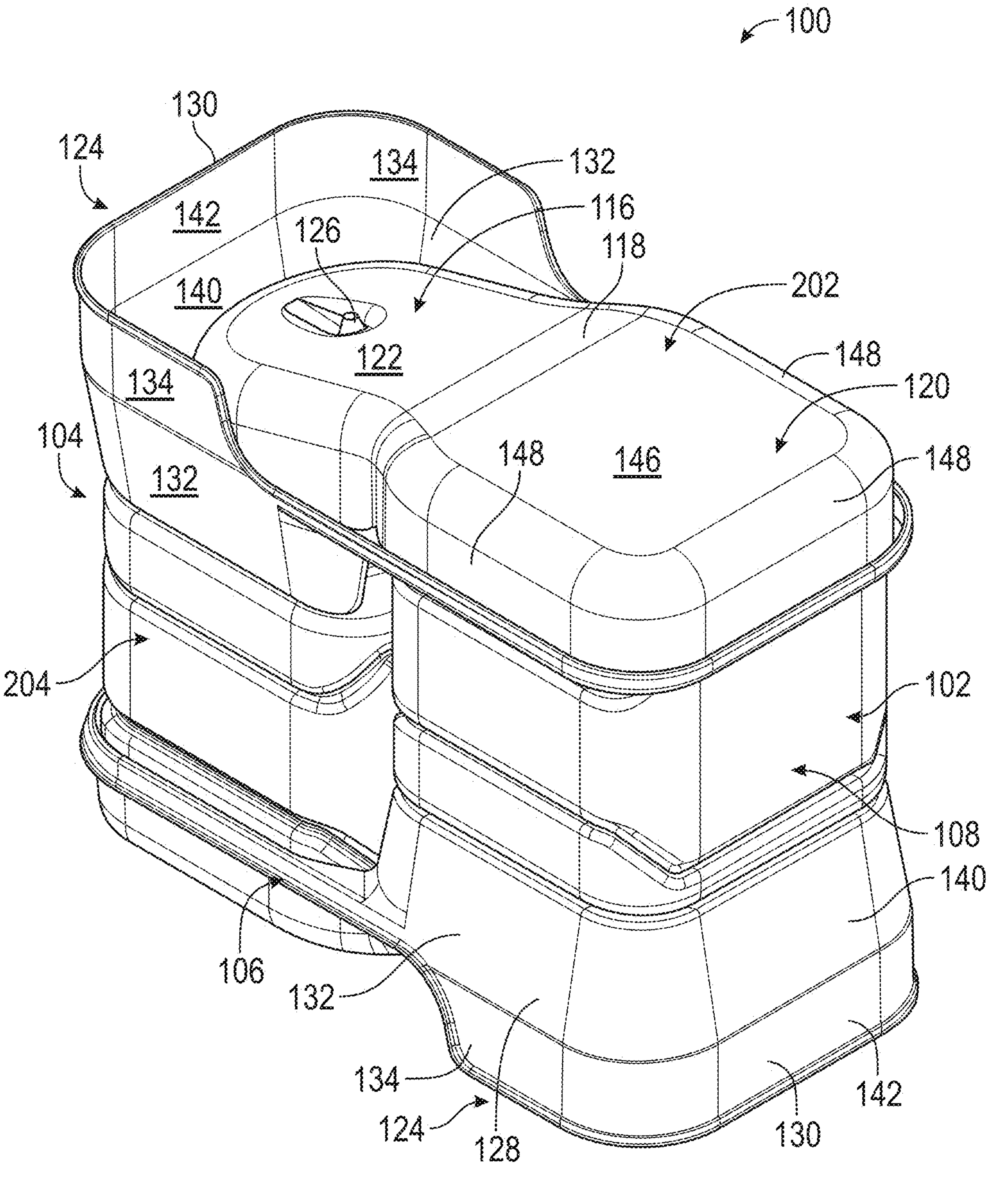
FIG. 1 is a perspective view of a feeder and waterer assembly, including a feeder and a waterer, the feeder including a feeder base and a feeder bottle, and the waterer including a waterer base and a waterer bottle, in an example embodiment.
Figure 2:
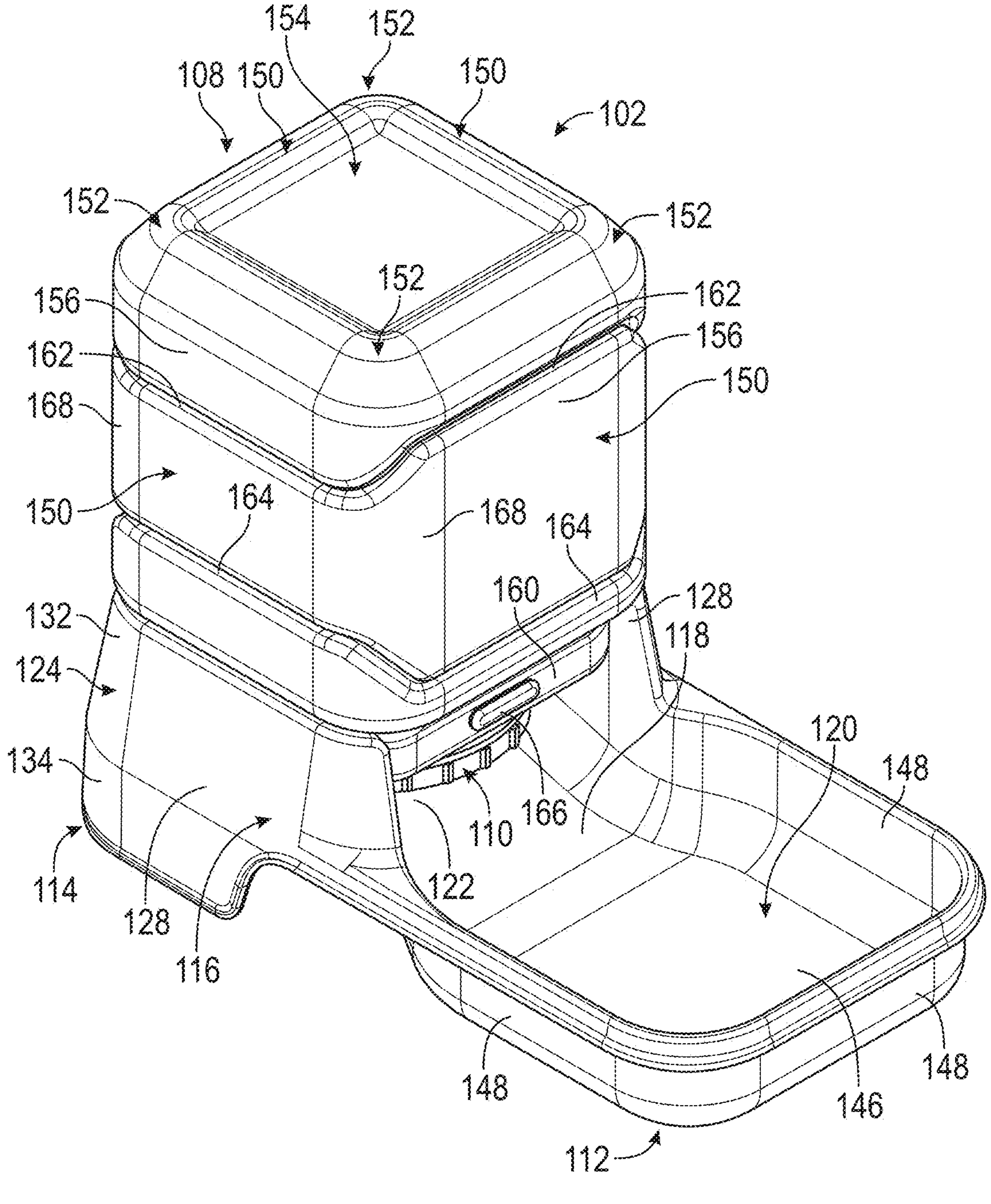
FIG. 2 is a perspective view of the waterer of FIG. 1, in an example embodiment.

Referring initially to FIG. 1, a gravity fed feeder and a gravity fed waterer are illustrated in accordance with an exemplary embodiment. The feeder includes a bowl unitarily formed or molded with a base and a detachable bottle. The waterer also includes a bowl unitarily formed or molded with a base and a detachable bottle. The waterer is shown in FIG. 2 removed from the feeder.

The shape and form of the bottle is directly related to the bowl shape. Specifically, the top of the waterer bottle is dimensioned and shaped to fit and nests into the feeder bowl. Further, the top of the feeder bottle is dimensioned and shaped to fit and nest into the water bowl. Thus, as shown in FIG. 1, when stored or packed for shipping, the feeder and the waterer are nested into one another. Put another way, the shape of the bowls are matched to the top of the bottles which enables the bottle to nest into the bowl. The length, width and top surface of the bottles and convex shaped surface of the bottles matches the length, width and concaved interior lower surface of the bowl.

The nesting of the waterer and the feeder as shown in FIG. 1 presents a stable stack suitable for display on a retail shelf and not topple easily. Further, when packing for shipping, the nested waterer and feeder fit conveniently in a rectangular shaped box that needs no filler or cushioning to prevent movement of the waterer and feeder once packed within a correspondingly dimensioned box.

The bowl and base of the feeder and the bowl and base of the waterer are basically identical or substantially identical and interchangeable. This enables the same molds to produce the feeder and the waterer bowls, reducing cost and increasing the likelihood that the feeder and the waterer bowls will have the same or similar dimensions. Further the bottle of the feeder and the bottle of the waterer are dimensionally identical or substantially identical, except that the bottle of the feeder has an opening and corresponding lid mentioned below.

Hence, the pet gravity feeder and waterer are built from a library of interchangeable parts, providing maximum flexibility for customer offerings using the least number of different parts, with a focus on dual function. The Pet Gravity Feeder and the corresponding Waterer are designed for a compact assembly maximizing shelf space and shipper carton cube. In the assembled condition, the bottle nests into the bowl, creating a more stable assembly on the retailer shelf and in the shipper carton.

The bottle is designed to be used as a feeder or waterer. When used as a Waterer, a secondary threaded cap can optionally be added. The cap can at least partially occupy an opening of the bottle to reduce the size of the opening to prevent the water from coming out too quickly when turning it upside down and attaching the bowl. The cap can have a plunger attached that would automatically close when upside down, until it is assembled to bowl, where the bottom of the bowl pushes upward on the plunger to allow water to flow out. The cap can contain a filter that would be retained on the inside of the cap to remove impurities from the water while water flows out of the bottle into the bowl.

Figure 4:
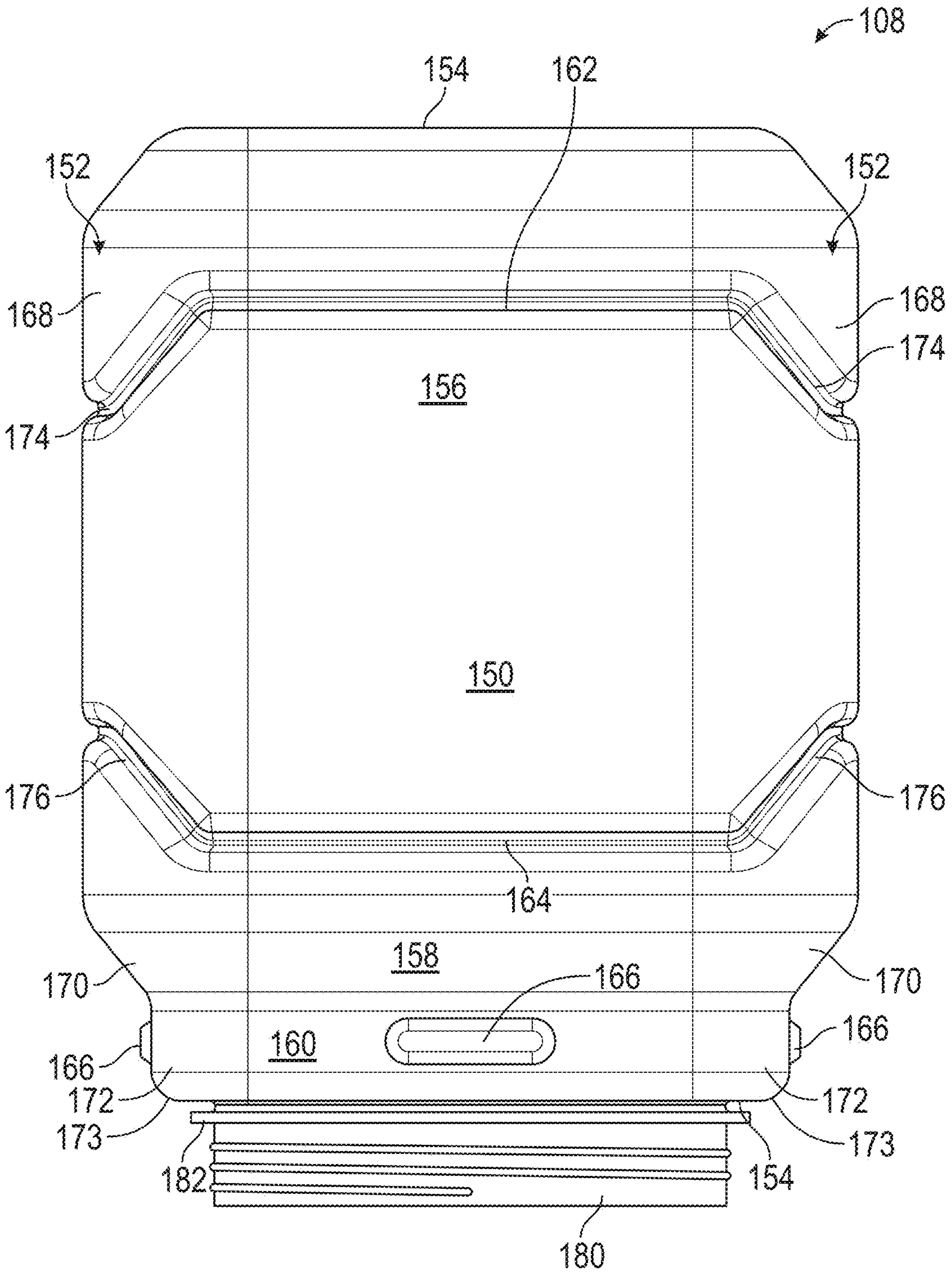
FIG. 4 is a front view of the waterer bottle of FIG. 2, in an example embodiment.
Figure 5:
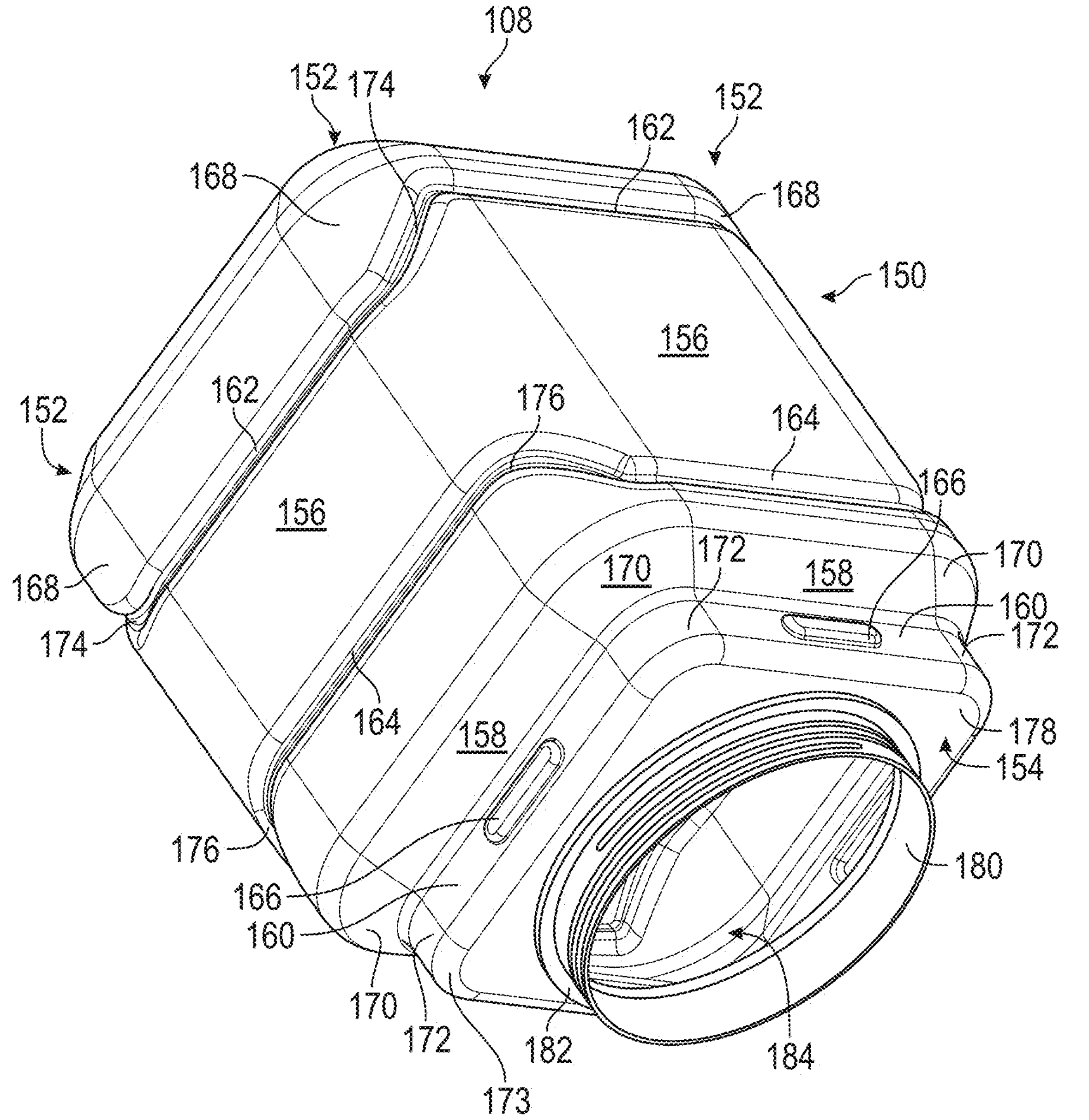
FIG. 5 is a bottom perspective view of the waterer bottle of FIG. 2, in an example embodiment.
Figure 6:
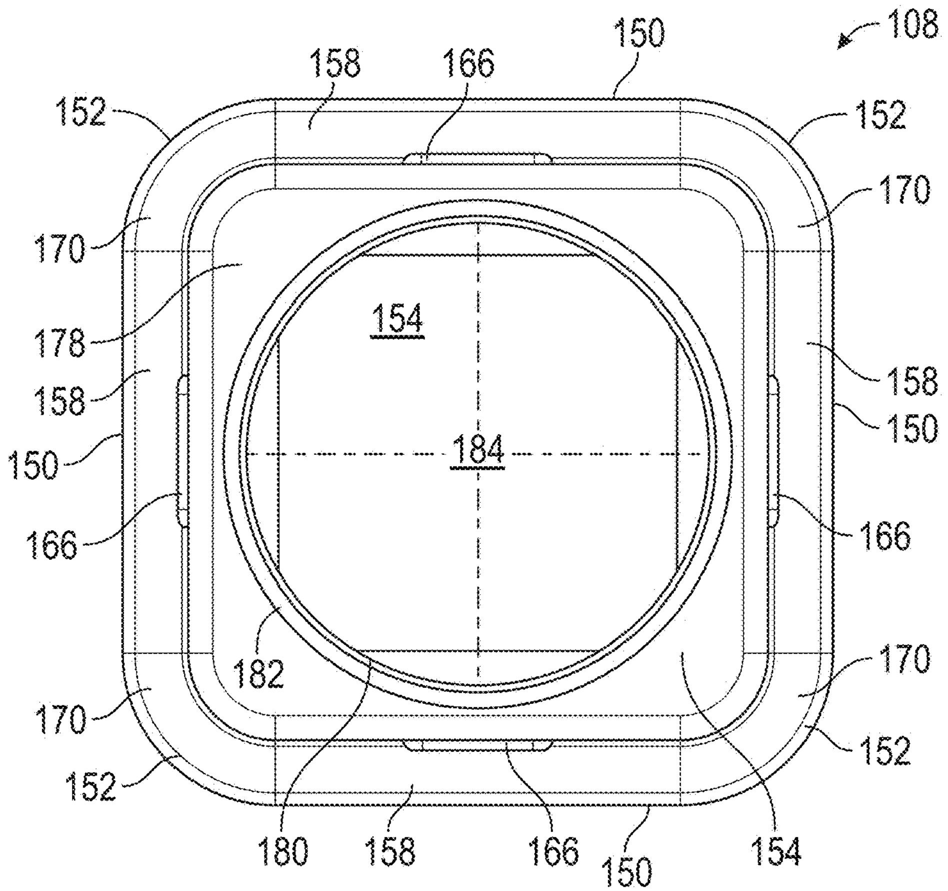
FIG. 6 is a bottom view of the waterer bottle of FIG. 2, in an example embodiment.
Figure 7:
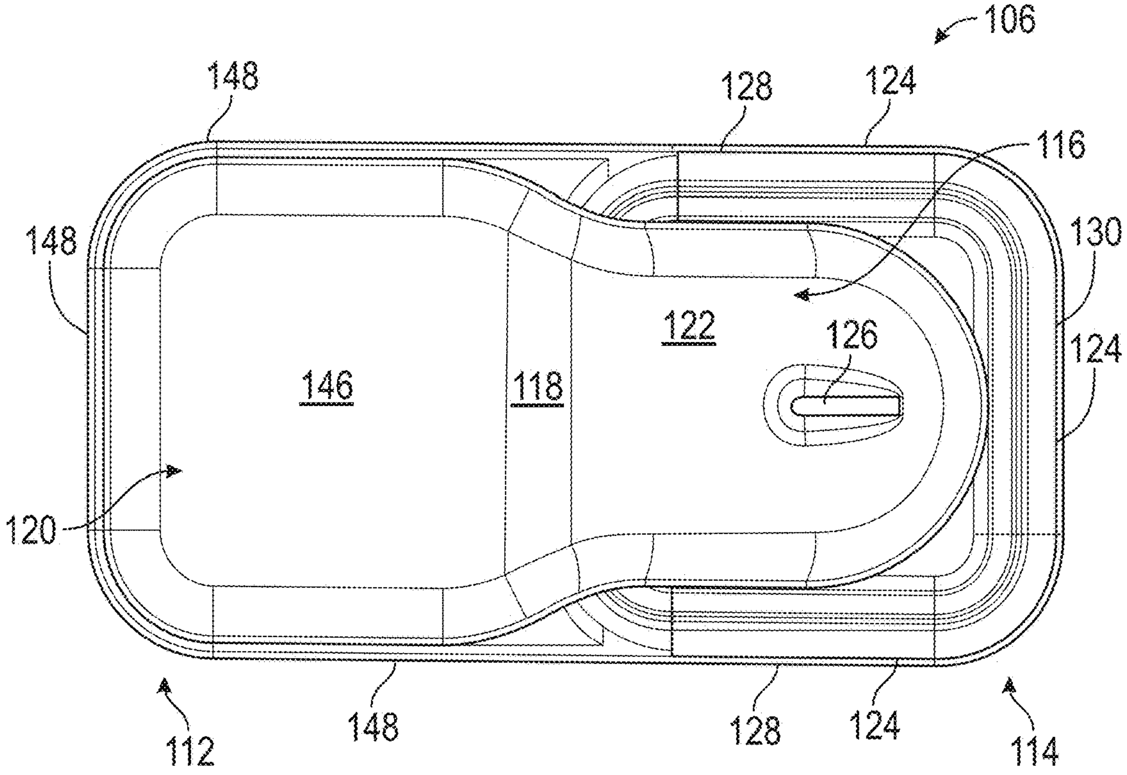
FIG. 7 is a bottom view of the waterer of FIG. 1, in an example embodiment.

The bottom of the bottle (that attaches to the base) includes an opening that is larger than most water bottles, as shown in FIGS. 4 and 5. The large opening enables the consumer to clean the inside of the bottle more easily. The larger opening allows dry pet food to flow more easily onto the ramp from the base portion below the bottle, the ramp leading to the bowl.

Figure 3:
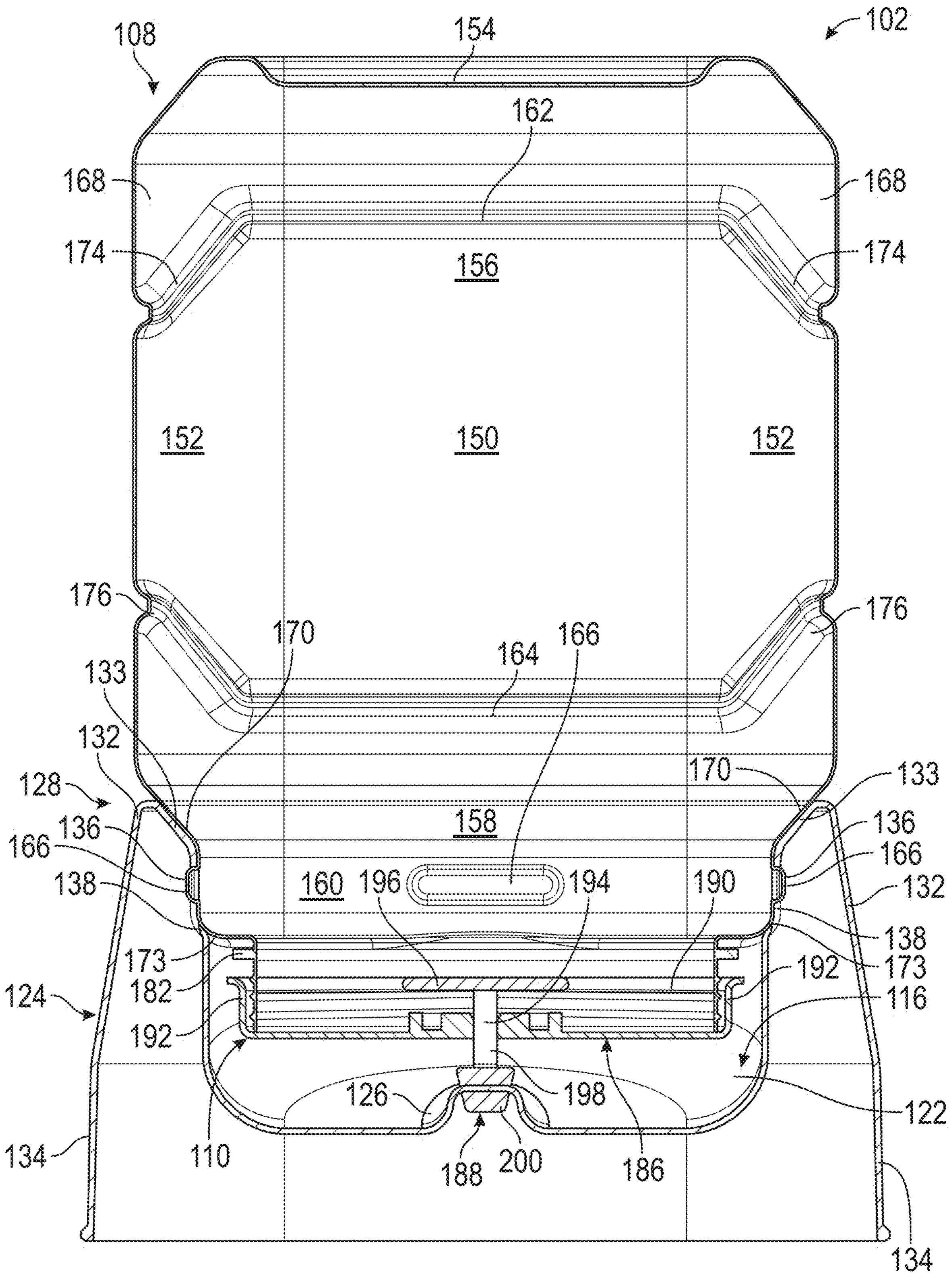
FIG. 3 is a front cross-sectional view of the waterer of FIG. 1, in an example embodiment.

As shown in FIGS. 3 and 4, the opening size is directly related to the relationship of the closest tangency point on a shelf of the bottle. The larger the opening the better the food flow. The feeder bottle might include an internal ring or cross bar to prevent a pet from becoming entrapped by the bottle opening. The cross bar might be a single or double bar, or 3 bars that were not connected except to the bottle.

Figure 9:
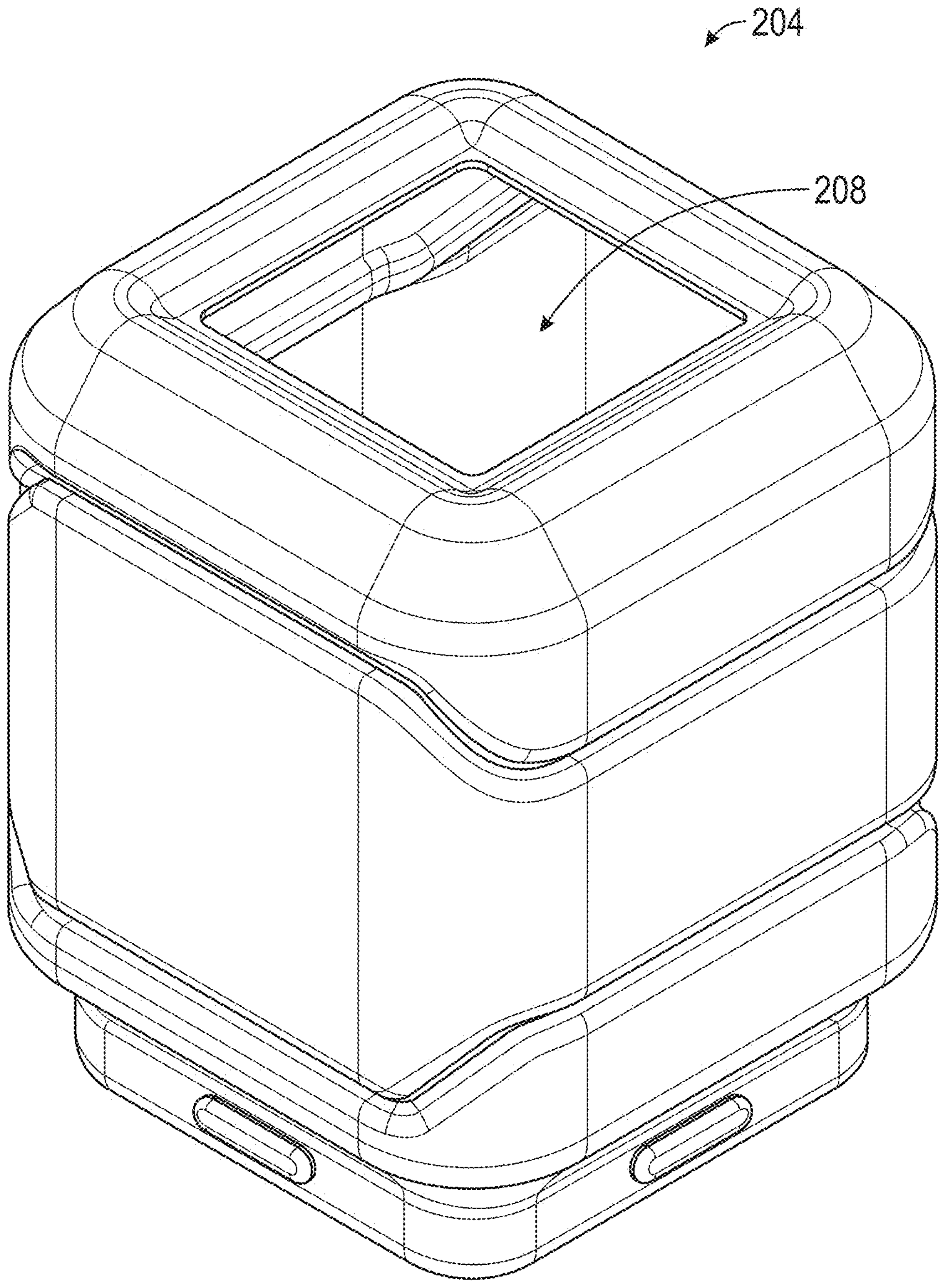
FIG. 9 is a perspective view of the feeder bottle of FIG. 1, in an example embodiment.
Figure 10:
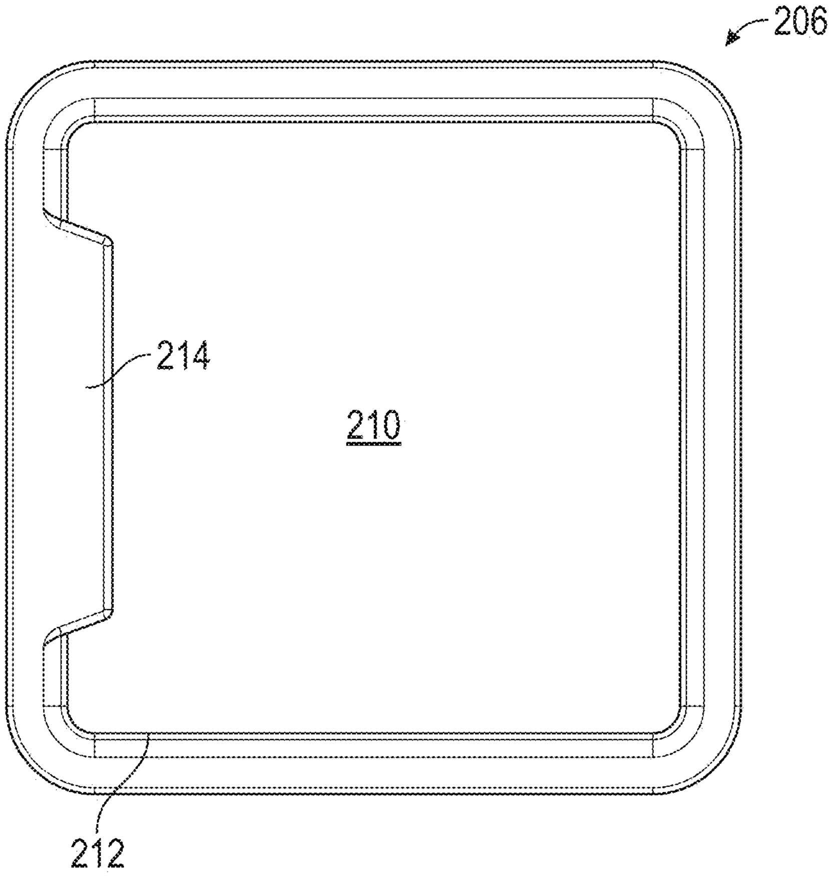
FIG. 10 is a top view of a feeder lid, in an example embodiment.

As shown in FIGS. 9 and 10, the feeder bottle can be built to include an opening in the top of the bottle that receives a correspondingly dimensioned lid to easily add food without disassembling the bottle from the base portion and bowl. Alternatively, the feeder can be used without a hole in the top of the bottle. Instead, the bottle can be disassembled from the base portion and bowl to add food through the threaded opening.

As shown in FIGS. 4 and 5, the bottle has a threaded opening at its bottom end that mate with corresponding threads in the base portion above the ramp leading to the bowl.

The shelf or flat areas within the bottle around the opening are reduced to minimum dimension. Food cannot easily fall from the shelf into the bowl so the current design minimizes the size of such shelves.

The size of the opening in the bottom of the bottle is dictated by the relationship between the flange diameter of the bottle (see FIG. 4) and the closest intersection of a flat surface and rounded corner identified as a tangent intersection. The flange can extend no farther than that tangency point but might be as small as $1/10^{th}$ of the widest length, width or diameter of the bottle. The bottle is symmetrical and can be installed on any of the 4 sides of the base portion facing the back of the bowl.

In the depicted embodiment, the bottle has an overall square-like shape. The bottle can be square, rectangular, round or oval. The bottle is held in place by trapping one of the ellipsoid protrusions into a matching cutout or concaved area along the base portion sidewall above the ramp. To maximize stability in the bowl to bottle, the bowl matching wall should extend above the ellipsoid. Further, the shoulder of the bowl extends higher than the ellipsoid, as is also shown in FIG. 4. Preferably, ¼ to ⅓ of the overall bottle height is below the upper most shoulder of the bottle.

Figure 8:
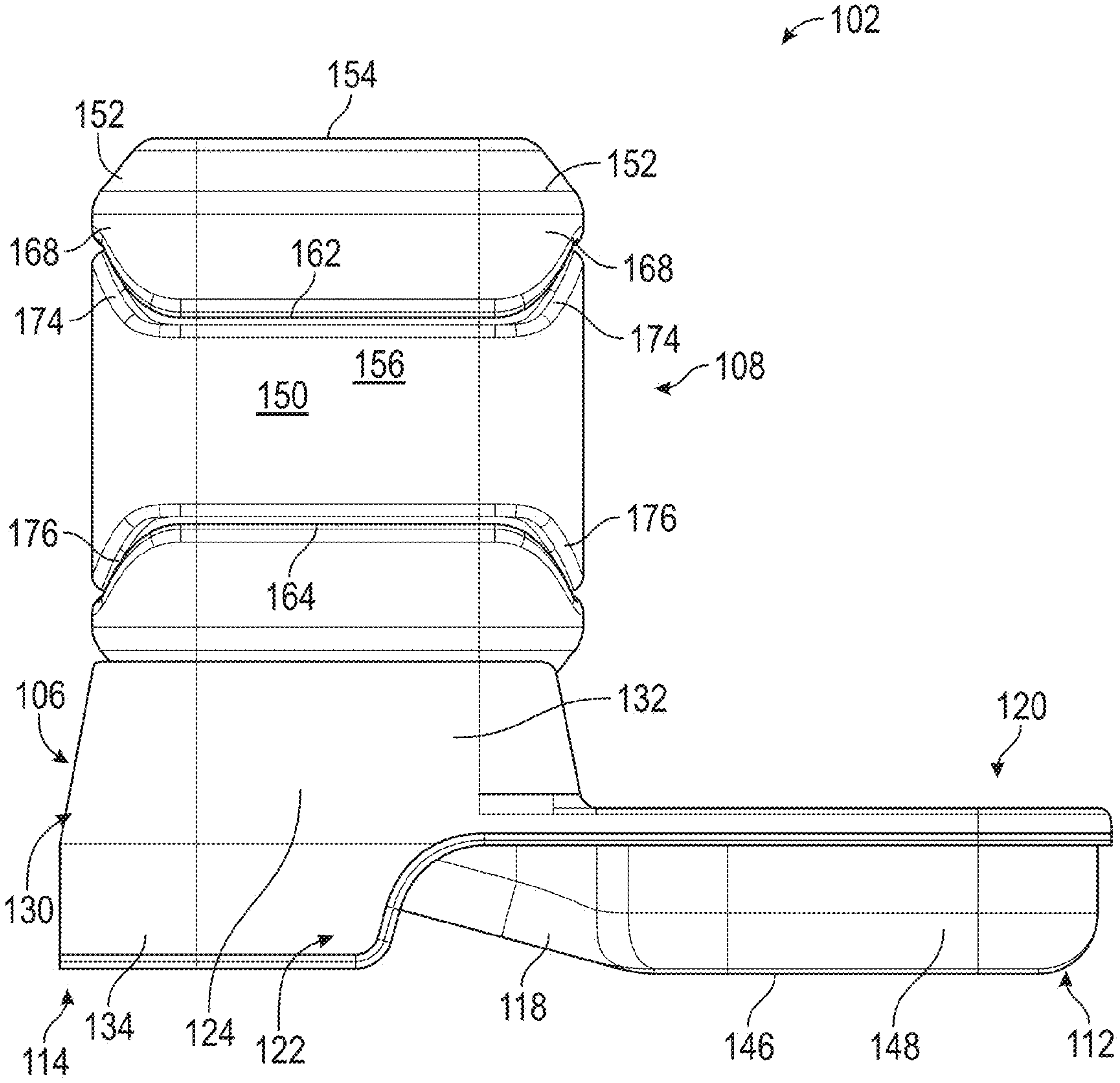
FIG. 8 is a side view of the waterer of FIG. 1.

As shown in FIG. 8, the overall height of the bottle is related the height of the bowl HB. The height of the bowl HB, bottle and overall assembly Ho are designed to be proportional to lower the center of gravity. This will reduce the possibility of the waterer or feeder from tipping over by increasing stability thereof. The bowl height HB ranges from 31% to 46% of the overall height Ho of the assembled bottle and bowl.

The same bottle is used for the feeder and the waterer. This enables the same molds to produce the feeder and the waterer bottles, reducing cost and increasing the likelihood that the feeder and the waterer bottles will have the same or similar dimensions. As shown in FIG. 10, when the bottle is used as a feeder, the top of the bottle can include an opening or cutout post molding, and a lid shown in FIGS. 10 and 11 can be employed to cover and seal the opening in the top of the bottle.

The lid is low profile so as not to interfere with the nested configuration of the bottle and bowl when stacked. The lid is designed to rely on the cutout dimensions of the opening for the snap fit and not be dependent on an outside upper shoulder of the bottle.

The exterior flat surface of the lid can be either concave or flat. The concave lid design can include a tab or handle that extends into the concaved area to allow the consumer to grab the tab to remove the lid.

II. Feeder and Waterer Assembly

A gravity feeder and waterer provide food and water to an animal. Gravity feeders and waters enable a consumer to avoid manually refilling a food or water bowl for every meal. The feeder and waterer may be shipped to consumers. However the feeder and waterer are often shipped in separate packages or with excessive packing material due to bulky sizes or alternate sizes and shapes between the feeder and the waterer.

The present disclosure relates to a feeder and water assembly including a feeder and a waterer. The feeder includes a feeder bottle and a feeder base and the waterer includes a waterer bottle and a waterer base. The feeder bottle and the waterer bottle may be manufactured from the same mold (e.g., a blow molding mold, an injection molding mold, or some other mold) and the waterer base and the feeder base may be manufactured from the same mold (e.g., a blow molding mold, an injection molding mold, or some other mold). The feeder and waterer may be stacked together in a nested assembly configuration during shipping to reduce the volume of the packaging and enable the package to ship with a low tolerance between the footprint of the assembly and the package, enabling the shipment to omit packing material. The base of the feeder and the waterer are configured to direct food and water from the bottle towards a bowl where an animal may access the food or water. The bottles each include side walls with multiple indentations. The indentations are configured to reduce movement of the side walls—and correspondingly reduce a noise produced by movement of the side walls—when water is dispensed and facilitate blow molding. For example, the indentations formed in the side walls of the bottle, particularly in the case of the waterer, increase a rigidity of the side walls of the bottle to reduce the extend to which the side walls flex inward and outward as water is dispensed from the bottle and air enters the bottle (e.g., to fill the volume previously occupied by the dispensed water). The waterer includes a waterer cap assembly configured to reduce noise produced when water is dispensed and enable a user to fill and refill the water bottle without leaking water onto the floor. The feeder bottle includes a lid configured to enable access to the feeder bottle. The lid enables the user to fill food in the feeder bottle without lifting or removing the feeder bottle. The feeder bottle also includes a ring insert configured to prevent an animal from entering or becoming lodged within the feeder bottle. The bases are also stable and prevent an animal from easily knocking over the bottles. The use of a single mold for both the bottles and a single mold for both the bases reduces change over time, increases efficiency, and increases profitability of the feeder and waterer.

FIG. 1 depicts an assembly, shown as feeder and waterer assembly 100. The assembly 100 includes a waterer 102 (e.g., a water-dispensing device, a liquid-dispenser) and a feeder 104 (e.g., a food-dispensing device, a foodstuff dispenser). The waterer 102 and the feeder 104 are each gravity-operated to provide a consistent supply of food and water to an animal. Specifically, water or food (e.g., solid food pellets) are respectively dispensed from the waterer 102 and the feeder 104 passively under force of gravity. As depicted in FIG. 1, the waterer 102 and the feeder 104 are in a stacked (e.g., nested, condensed, etc.) configuration for shipping and storage. The assembly 100 is stable, does not easily topple, and is suitable for display on a retail shelf. When packed for shipping, the assembly 100 fits conveniently in a rectangular shaped box without any filler or cushioning to prevent movement of the assembly 100 once packed within a correspondingly dimensioned box.

As shown in FIGS. 1-3, and 8, the waterer 102 includes a waterer base 106 (e.g., a bottle support structure, a foundation, etc.), a waterer bottle 108 (e.g., vessel, container, jug, pitcher, etc.), and a waterer cap assembly 110 (e.g., non-spill cap, anti-splash cap, etc.) shown in FIGS. 2 and 3. The waterer bottle 108 is received within and supported by the waterer base 106. The shape and form of the waterer bottle 108 corresponds to the waterer base 106. Specifically, a lower end of the waterer bottle 108 is dimensioned and shaped to be received by a portion of the waterer base 106 to couple the waterer bottle 108 with the waterer base 106. The waterer base 106 supports the waterer bottle 108 in an upright position to facilitate the dispensing of water (or some other liquid) from the waterer bottle 108 into a bowl of the waterer base 106. In addition, the bowl of the waterer 102 includes a size or dimension that corresponds to or is configured to receive an upper portion of a second bottle (e.g., a feeder bottle 204) to enable stacking or nesting of a waterer 102 with a feeder 104 or another waterer. The waterer cap assembly 110 is received within the waterer bottle 108 and can cover an opening in the bottle 108 to contain water (or some other liquid) within the bottle 108. The waterer cap assembly 110 can selectively engage with (e.g., contact, press against, be actuated by) a portion of the waterer base 106 when the waterer bottle 108 is coupled to the waterer base 106. Engagement between the waterer cap assembly 110 and the waterer base 106 can selectively open a portion of the waterer cap assembly 110 to allow water to be dispensed from the waterer bottle 108 and into the bowl of the waterer base 106. The waterer cap assembly 110 is configured to prevent the water from falling out of the waterer bottle 108 when a user is refilling and reinstalling the waterer bottle 108 into the waterer base 106, and configured to enable the water to flow from the waterer bottle 108 to the waterer base 106 when the waterer bottle 108 is coupled to the waterer base 106.

Referring now to FIGS. 1-6 and 8, the waterer bottle 108 includes a plurality of bottle sides 150, a plurality of bottle corners 152, and a plurality of bottle ends 154 (e.g., a first end and a second end, an upper end and a lower end, etc.). Each of the bottle sides 150 extends between adjacent corners 152. Each of the water bottle corners 152 and the bottle sides 150 extends between the bottle ends 154. In the illustrated embodiment, the waterer bottle 108 includes four bottle corners 152, four bottle sides 150, and two bottle ends 154 such that the bottle 108 forms a substantially prismatic shape. In other examples, the bottle 108 can include a circular, oval, triangular, or some other. In the depicted embodiment, the waterer bottle 108 defines a substantially rectangular prism volume. The perimeter of each of the bottle ends 154 defines a substantially square perimeter. In some embodiments, the waterer bottle 108 defines an alternate volume (e.g., cube, etc.). In some embodiments, the perimeter of each of the bottle ends 154 defines an alternate perimeter (e.g., rectangular perimeter, etc.).

Each of the bottle sides 150 include a bottle side upper surface 156 (e.g., a first portion, etc.), a bottle side shoulder 158 (e.g., a second portion, etc.), and a bottle side lower surface 160 (e.g., a third portion, etc.). The bottle side upper surface 156 extends between the upper bottle end 154 and the bottle side shoulder 158. The bottle side shoulder 158 extends between the bottle side upper surface 156 and the bottle side lower surface 160 and is configured to contact the wall ledge 138 of the waterer base 106. The bottle side shoulder 158 extends at an obtuse angle with respect to the bottle side upper surface 156. The bottle side lower surface 160 extends between the bottle side shoulder 158 and the lower bottle end 154. The bottle side lower surface 160 is substantially parallel to the bottle side upper surface 156. The bottle side shoulder 158 is angled with respect to the bottle side lower surface 160 (e.g., at an obtuse angle, etc.) so as to minimize flat, horizontal areas within the waterer bottle 108. Minimizing the instances of horizontal areas within the waterer bottle 108 enables substances (e.g., food, etc.) to fall into the waterer base 106 without becoming trapped on the bottle side shoulder 158, for example. A diameter of the waterer bottle 108 along the lower bottle end 154 between two of the bottle side lower surfaces 160 is less than a diameter of the waterer bottle 108 between two of the bottle side upper surfaces 156. In the illustrated embodiment, 25% to 33% of an overall height of the waterer bottle 108 is blow the bottle side shoulder 158 to increase stability.

Each of the bottle side upper surfaces 156 includes at least one indentation (e.g., recess, groove, slot, valley, or other impression). Specifically, the bottle side upper surfaces 156 include an upper side indentation 162 (e.g., first groove, upper channel, etc.) and a lower side indentation 164 (e.g., second groove, lower channel, etc.). The upper side indentation 162 is substantially parallel to the lower side indentation 164. In the depicted embodiment, the upper side indentation 162 and the lower side indentation 164 extend in a substantially horizontal direction. In other embodiments, the upper side indentation 162 and the lower side indentation 164 can extend in some other direction. The upper side indentation 162 and the lower side indentation 164 are each configured to prevent and reduce noises (e.g., glubbing, crinkling, crunching, blips, etc.) when the water exits the waterer bottle 108 (e.g., as the water is dispensed from the bottle 108 and air bubbles into the bottle 108 to fill the volume previously occupied by the dispensed water). The bottle sides 150 may move (e.g., flex, vibrate, oscillate) inwards and outwards of the waterer bottle 108 as the water exits the waterer bottle 108 and/or as air enters the bottle 108. The upper side indentation 162 and the lower side indentation 164 split of the bottle sides 150 into multiple areas increases a structural rigidity and stiffness of the bottle sides 150 (e.g., relative to a bottle side with no indentations) to consequently minimize a movement of the bottle sides 150, thereby reducing noise produced by the waterer bottle 108. Animals may be frightened of loud noises and develop an aversion to using a waterer if the waterer emits loud noises. When animals avoid the waterer, owners may undergo extensive and cumbersome training with the animal (e.g., treats, clicker training, etc.) to attempt to overcome the aversion. This aversion to the waterer 102 may lead the animal to restrict their intake of water and lead to dehydration. The upper side indentation 162 and the lower side indentation 164 reduce noise levels, and therefore reduce the chances of an animal developing an aversion to the waterer 102. Additionally, the upper side indentation 162 and the lower side indentation 164 facilitate blow molding, and aid in the manufacturing process. The upper side indentation 162 and the lower side indentation 164 help trap air in the molten plastic when forming the waterer bottle 108, contributing to a more efficient blow molding process.

Each of the lower surfaces 160 includes a bottle protrusion 166 (e.g., a base connecting portion, a stand coupling portion, etc.). The bottle protrusion 166 engages with (e.g., fits within, couples to, contacts, nests at least partially inside) a side wall aperture 136 of the waterer base 106, as is discussed below. The engagement between the waterer bottle 108 and the waterer base 106, can act to prevent an animal from knocking the waterer bottle 108 from the waterer base 106 and spilling water, for example. The engagement between the bottle protrusion 166 and the side wall aperture 136 of the base 106 also enables a user to easily couple and de-couple the waterer bottle 108 from the waterer base 106, reducing the time a user spends when refilling the waterer bottle 108. Further, the coupling of the bottle 108 with the base 106 via engagement of the bottle protrusion 166 with the side wall aperture 136 can provide tactile feedback to a user to indicate a successful engagement of the bottle 108 with the base 106. In the illustrated embodiment, the bottle protrusions 166 are each shaped as an ellipsoid. In some embodiments, the bottle protrusion 166 may form an alternate shape (e.g., a rectangle, a circle, a square, etc.). In the illustrated embodiment, the waterer bottle 108 is symmetrical and includes four bottle protrusions 166, enabling the waterer bottle 108 to be coupled to any of the stand walls 124 of the stand 116 (e.g., the waterer bottle 108 may be rotated about a center axis for three adjacent bottle protrusions 166 to be coupled to three of the stand walls 124).

The bottle corners 152 each include an upper corner surface 168, a corner shoulder 170, and a lower corner surface 172. The upper corner surface 168 extends between the upper bottle end 154 and the corner shoulder 170. The corner shoulder 170 extends between the upper corner surface 168 and the lower corner surface 172 and is configured to contact the wall ledge 138 of the waterer base 106. The lower corner surface 172 extends between the corner shoulder 170 and the lower bottle end 154. The upper corner surface 168 defines an upper corner indentation 174 and a lower corner indentation 176. The upper corner indentation 174 extends between two neighboring upper side indentations 162 and the lower corner indentation 176 extends between two neighboring lower side indentations 164. Each of the upper corner indentation 174 and the lower corner indentation 176 are curved. The upper corner indentation 174 and the lower corner indentation 176 are configured to prevent and reduce the loud noises produced by the bottle sides 150 moving in and out when the water exits the waterer bottle 108.

One of the bottle ends 154 includes a bottom flat side 178 (e.g., a flat surface, a lower bottle end flat surface, etc.), a downward extending bottom flange 180, and an outward extending bottom flange 182. The bottom flat side 178 extends substantially perpendicular to the lower surface 160. The area of the bottom flat side 178 is minimized to prevent substances (e.g., food) from being stuck inside the waterer bottle 108. The outward extending bottom flange 182 extends substantially perpendicular to the bottom flat side 178 and couples to the waterer cap assembly 110. The downward extending bottom flange 180 extends substantially perpendicular to the outward extending bottom flange 182. The bottom flat side 178 is offset from the stand base 122 in a vertical direction. The bottom flat side 178 defines a bottom side aperture 184. The bottom side aperture 184 is configured to receive at least a portion of the waterer cap assembly 110. The bottom side aperture 184 can be dimensioned or otherwise configured to enable a user to clean the inside of the waterer bottle 108, such as by including an inner diameter that can readily receive a user's hand during a cleaning action. The bottom side aperture 184 enables material (e.g., solid food, etc.) to flow more easily from the waterer bottle 108. The size of the bottom side aperture 184 is related to a diameter of the outward extending bottom flange 182 and the closest intersection of the bottom flat side 178 and a rounded surface (the lower corner surface 172 or the bottle side lower surface 160). This intersection area is also known as a tangent intersection. In the illustrated embodiment, the outward extending bottom flange 182 extends no further than the tangency point, but may be as small as $1/10^{th}$ of the widest length, width, or diameter of the waterer bottle 108.

The waterer base 106 includes a proximal end 112 (e.g., first end, a bowl end, a drinking end) and a distal end 114 (e.g., a second end, a bottle end) opposite the proximal end 112. The waterer base 106 includes a stand 116 (e.g., bottle receiving portion, a bottle support portion, etc.), a ramp 118 (e.g., an incline, a food directing ramp, etc.), and a bowl 120 (e.g., basin, dish, reservoir, etc.). The stand 116 and the ramp 118 are unitarily formed or molded with the bowl 120. At least a portion of the stand 116 is disposed along or proximate the distal end 114. At least a portion of the bowl 120 is disposed along or proximate the proximal end 112. The ramp 118 extends between the stand 116 and the bowl 120. The stand 116 is configured to couple a lower end of the waterer bottle 108. The shape and form of the bowl 120 (e.g., the length, width, and area, etc.) corresponds to (e.g., is dimensionally and geometrically similar to) an upper end of the waterer bottle 108 to facilitate coupling of the waterer bottle 108 with the waterer base 106. For example, a shape of the bowl 120 substantially matches or corresponds to the top of the waterer bottle 108 such that the waterer bottle 108 can nest or fit within the bowl 120). The ramp 118 extends downward from the stand 116 towards the bowl 120 to direct dispensed water under gravitational force from the bottle 108 to the bowl 120 where the animal can access and drink the water.

The stand 116 includes a stand base 122 (e.g., a bottom portion, a lower portion, etc.) and a plurality of stand walls 124 (e.g., sides, bottle contacting walls, etc.) extending from along a periphery of the stand base 122. At least a portion of the stand walls 124 are configured to couple to and support the waterer bottle 108. For example, at least a portion of the waterer bottle 108 can contact each of the stand walls 124 when the waterer bottle 108 is coupled with the waterer base 106 and support the waterer bottle 108 in an upright position. The stand base 122 includes a bottle contacting protrusion 126 extending substantially vertically (e.g., upward) from the stand base 122 toward the waterer bottle 108. The bottle contacting protrusion 126 is configured to contact a portion of the waterer cap assembly 110 (e.g., a plunger or of the waterer cap assembly 110) when the waterer bottle 108 is installed in the waterer base 106 to enable water to release from the waterer bottle 108 and into the waterer base 106.

Figure 18:
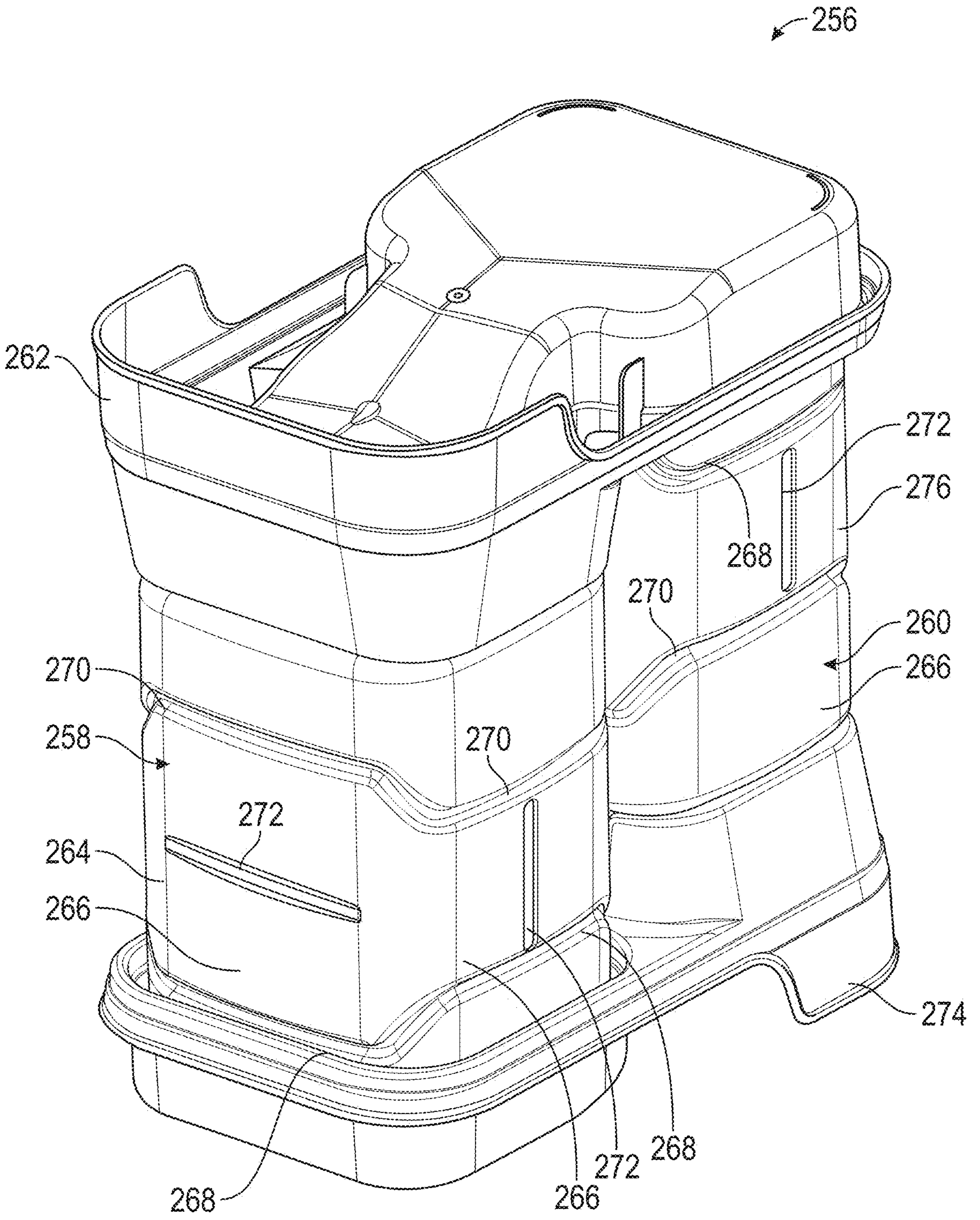
FIG. 18 is a perspective view of a feeder and waterer assembly, including a feeder and a waterer, the feeder including a feeder base, a feeder bottle, and a ring insert, and the waterer including a waterer base, a waterer bottle, and a waterer cap, in an example embodiment.

As depicted in FIGS. 3, 8, and 18, among others, the stand walls 124 include at least one stand side wall 128 (e.g., left or right side walls, etc.) and at least one stand back wall 130 (e.g., rear wall, etc.). As shown, the stand back wall 130 extends between two stand side walls 128. The stand side walls 128 are each substantially parallel to each other and the stand back wall 130 is substantially perpendicular to the plurality of stand side walls 128. The stand side walls 128 include an upper exterior side wall portion 132 (e.g., upper outer wall portion), a lower exterior side wall portion 134 (e.g., lower outer wall portions, skirt portion), and an interior side wall portion 133 (e.g., bottle-engaging walls, inner sidewall portions). The inner side wall portions 133 extend at least partially in a vertical direction (e.g., at some vertically-sloped angle) to form an inner bottle-supporting portion of the stand 116. Specifically, the inner side wall portion 133 of each of the side walls 128 and the stand back wall 130 contact the bottle side shoulder 158 of the waterer bottle 108 to support the waterer bottle 108 when the waterer bottle 108 is engaged with the waterer base 106. The inner side wall portion 133 extends at least partially at an angle that corresponds to the bottle side shoulder 158 of the waterer bottle 108 to maximize an area of the inner side wall portion 133 that is in contact with and supporting the bottle side shoulder 158 of the waterer bottle 108. The lower exterior side wall portions 134 extend downward away from the waterer bottle 108 and are configured to contact a support surface (e.g., a ground surface, etc.). As shown in FIG. 3 each of the upper exterior side wall portions 132 forms a top of the base 106 and is connected with the inner side wall portion 133. The inner side wall portion 133 defines a side wall aperture 136 (e.g., indentation, recess, protrusion receiving aperture, bottle receiving aperture, etc.) and includes a wall ledge 138 (e.g., stand shoulder, wall overhand, etc.). The wall ledge 138 of each of the inner side wall portions 133 further contacts and supports a crown portion 173 of the waterer bottle 108, and the side wall aperture 136 receives the bottle protrusion 166 of the waterer bottle 108. Specifically, the wall ledges 138 are dimensioned and positioned to wrap around a portion of the waterer bottle 108 to contact (e.g., support) the crown portion 173 of the waterer bottle 108 with the waterer bottle 108 in an upright position. In the illustrated embodiment, the wall ledge 138 extends from the inner side wall portion 133 to support a substantial entirety of the crown portion 173 of the bottle 108, for example. Each of the side wall apertures 136 formed in the inner side wall portion 133 can receive or otherwise engage with a bottle protrusion 166. For example, the bottle protrusion 166 engages with (e.g., fits within, couples to, contacts, nests at least partially inside) the side wall aperture 136 to couple the bottle 108 with the base 106. The engagement between the bottle protrusion 166 and the side wall aperture 136 can be a snap-fit engagement, an interference engagement, or some other engagement. In other examples, the bottle 108 can define recessed regions or indentations that receive protrusions extending from the inner side wall portions 133 of the base 106. In yet other examples, the side wall apertures 136 can include a spring element (e.g., a spring-loaded wall or surface) that can apply a spring force to the bottle protrusion 166 to further secure the bottle 108 with the base.

The stand back wall 130 includes a back wall upper portion 140 and a back wall lower portion 142, and an inner side wall portion 143. The inner side wall portion 143 extends at least partially in a vertical direction (e.g., at some vertically-sloped angle) to form an inner bottle-supporting portion of the stand 116. Specifically, the inner side wall portion 143 of the stand back wall 130 contacts the bottle side shoulder 158 of the waterer bottle 108 to support the waterer bottle 108 when the waterer bottle 108 is engaged with the waterer base 106. The inner side wall portion 143 extends at least partially at an angle that corresponds to the bottle side shoulder 158 of the waterer bottle 108 to maximize an area of the inner side wall portion 143 that is in contact with and supporting the bottle side shoulder 158 of the waterer bottle 108. The inner side wall portion 143 defines at least one side wall aperture 136 (e.g., indentation, recess, protrusion receiving aperture, bottle receiving aperture, etc.) and includes a wall ledge 138 (e.g., stand shoulder, wall overhand, etc.). The wall ledge 138 of the inner side wall portion 143 further contacts and supports a crown portion 173 of the waterer bottle 108, and the side wall aperture 136 receives the bottle protrusion 166 of the waterer bottle 108. In the illustrated embodiment, the wall ledge 138 extends from the inner side wall portion 133 to support a substantial entirety of the crown portion 173 along one side of the bottle 108, for example. The side wall apertures 136 formed in the inner side wall portion 143 can receive or otherwise engage with a bottle protrusion 166. For example, the bottle protrusion 166 engages with (e.g., fits within, couples to, contacts, nests at least partially inside) the side wall aperture 136 to couple the bottle 108 with the base 106. The engagement between the bottle protrusion 166 and the side wall aperture 136 can be a snap-fit engagement, an interference engagement, or some other engagement. In other examples, the bottle 108 can define recessed regions or indentations that receive protrusions extending from the inner side wall portion 143 of the base 106. In yet other examples, the side wall apertures 136 can include a spring element (e.g., a spring-loaded wall or surface) that can apply a spring force to the bottle protrusion 166 to further secure the bottle 108 with the base.

The bowl 120 includes a bowl base 146 (e.g., bowl lower portion, etc.) and a plurality of bowl walls 148 (e.g., bowl perimeter, bowl boundaries, etc.). The bowl walls 148 extend along a periphery of the bowl base 146 away from the support surface. The bowl walls 148 are substantially perpendicular to the bowl base 146. The bowl walls 148 are configured to prevent the water from leaving the bowl 120 while an animal drinks. The ramp 118 extends between the stand base 122 and the bowl base 146, and directs water towards the bowl base 146 for an animal to access. The ramp 118 extends at an oblique angle with respect to a plane the bowl base 146 extends along to direct the water towards the bowl 120. In some embodiments, the bowl walls 148 extend an acute angle with respect to the bowl base 146. In some embodiments, the bowl walls 148 extend an obtuse angle with respect to the bowl base 146. A height of the bowl 120 and an overall height of the assembly 100 are design to be proportional to lower the center of gravity to reduce the probability of the feeder 104 or the waterer 102 tipping. In the illustrated embodiment, a height of the bowl 120 is 31% to 46% of the overall height of the waterer 102.

Referring now to FIG. 3, the waterer cap assembly 110 includes a waterer cap body 186 and a waterer cap plunger 188. The waterer cap plunger 188 is received within the waterer cap body 186, and the waterer cap body 186 is coupled to the waterer bottle 108. The waterer cap plunger 188 interacts with the protrusion 126 so as push a portion of the waterer cap plunger 188 vertically upward to release the water from the waterer bottle 108. The waterer cap body 186 includes a waterer cap base 190 and a waterer cap upwardly extending flange 192. The waterer cap upwardly extending flange 192 extends upwardly from a periphery of the waterer cap base 190, and couples to the downward extending bottom flange 180 of the waterer bottle 108. The waterer cap base 190 defines a plunger receiving aperture 194 configured to receive a portion of the waterer cap plunger 188.

The waterer cap plunger 188 includes a plunger base 196 (e.g., a disk, etc.), a plunger rod 198 (e.g., pole, shaft, etc.), and a plunger tip 200 (e.g., protrusion contacting portion, stand contacting portion, etc.). The plunger base 196 is received within the waterer bottle 108. The plunger rod 198 extends from the plunger base 196 and through the plunger receiving aperture 194. The plunger tip 200 is coupled to the plunger rod 198 and contacts the protrusion 126. When the plunger tip 200 contacts the protrusion 126, the plunger tip 200, and therefore the plunger rod 198 and the plunger base 196 are pushed upward within the waterer bottle 108. Pushing the plunger base 196 upwards unseals the waterer cap assembly 110 and enables water to flow out of the waterer bottle 108. To fill the waterer bottle 108, a user removes the waterer bottle 108 from the waterer base 106. Removing the waterer bottle 108 from the waterer base 106 causes the plunger tip 200 to disengage from (e.g., cease contacting) the protrusion 126. The lack of pressure from the protrusion 126 causes the plunger base 196 to travel vertically downward and contact the waterer cap base 190 to seal the waterer cap assembly 110. The user then flips the waterer bottle 108 vertically (e.g., such that the waterer cap assembly 110 is on a top surface), removes the waterer cap assembly 110, fills the waterer bottle 108 with water, and re-couples the waterer cap assembly 110 to the waterer bottle 108. When the user flips the waterer bottle 108 over again to couple to the waterer bottle 108, the pressure of the water pushes down on the plunger base 196 and seals the waterer cap assembly 110 to prevent water from leaking.

Referring back to FIG. 1, the feeder 104 includes a feeder base 202, a feeder bottle 204, and a feeder lid 206 (e.g. a lid, a food seal, etc.). The feeder base 202 is configured substantially similar to the waterer base 106. The feeder bottle 204 is configured substantially similar to the waterer bottle 108. In the assembly, an upper end of the feeder bottle 204 is configured to be received within the bowl 120 of the waterer base 106. However, the feeder bottle 204 includes a top side aperture 208 (e.g., a lid receiving aperture, etc.) disposed along the upper bottle end 154 configured to receive the feeder lid 206. The feeder lid 206 may inserted and removed from the feeder bottle 204 with a snap-fit to enable a user to fill the feeder 104 without removing the feeder bottle 204 or picking up the feeder 104, increasing the ease of refilling the feeder 104.

Figure 11:
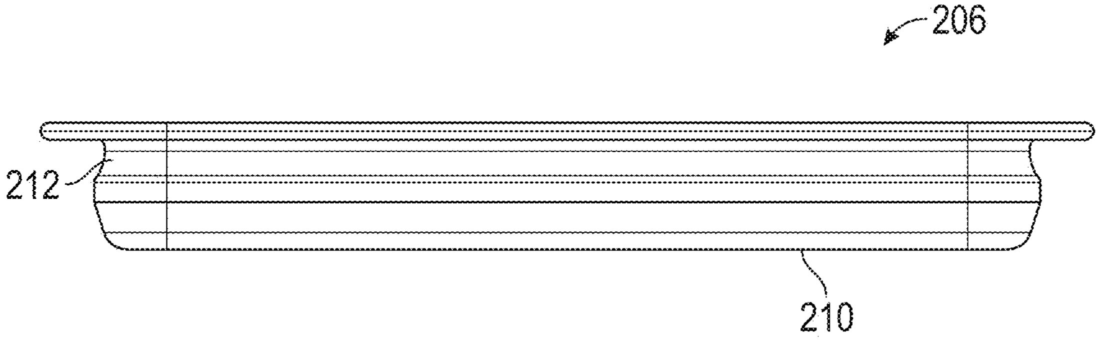
FIG. 11 is a side view of the feeder lid of FIG. 10, in an example embodiment.

Referring now to FIGS. 10 and 11, the feeder lid 206 includes a feeder lid base 210, feeder lid flanges 212, and a feeder lid tab 214. The feeder lid flanges 212 extend from a periphery of the feeder lid base 210 and are configured to contact the bottle end 154 of the feeder bottle 204. The feeder lid base 210 extends from one of the feeder lid flanges 212 substantially parallel to the feeder lid tab 214. The feeder lid tab 214 enables a user to grab a portion of the feeder lid 206 to easily remove the feeder lid 206. The feeder lid base is offset from the feeder lid flanges 212 so as to avoid interfering with the waterer bottle 108 when in the assembly 100 configuration.

Figure 12:
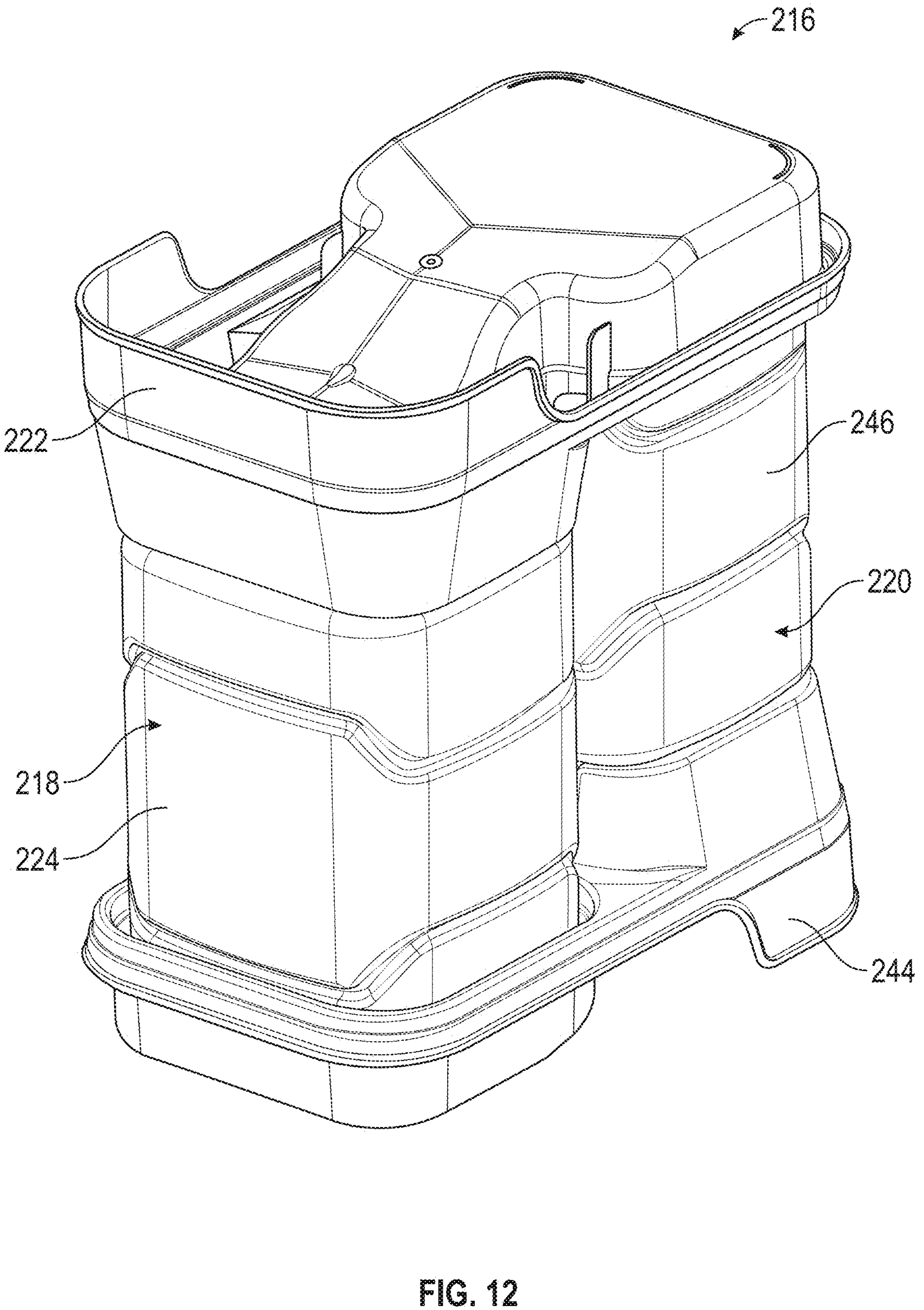
FIG. 12 is a perspective view of a feeder and waterer assembly, including a feeder and a waterer, the feeder including a feeder base, a feeder bottle, and a ring insert, and the waterer including a waterer base, a waterer bottle, and a waterer cap, in an example embodiment.
Figure 17:
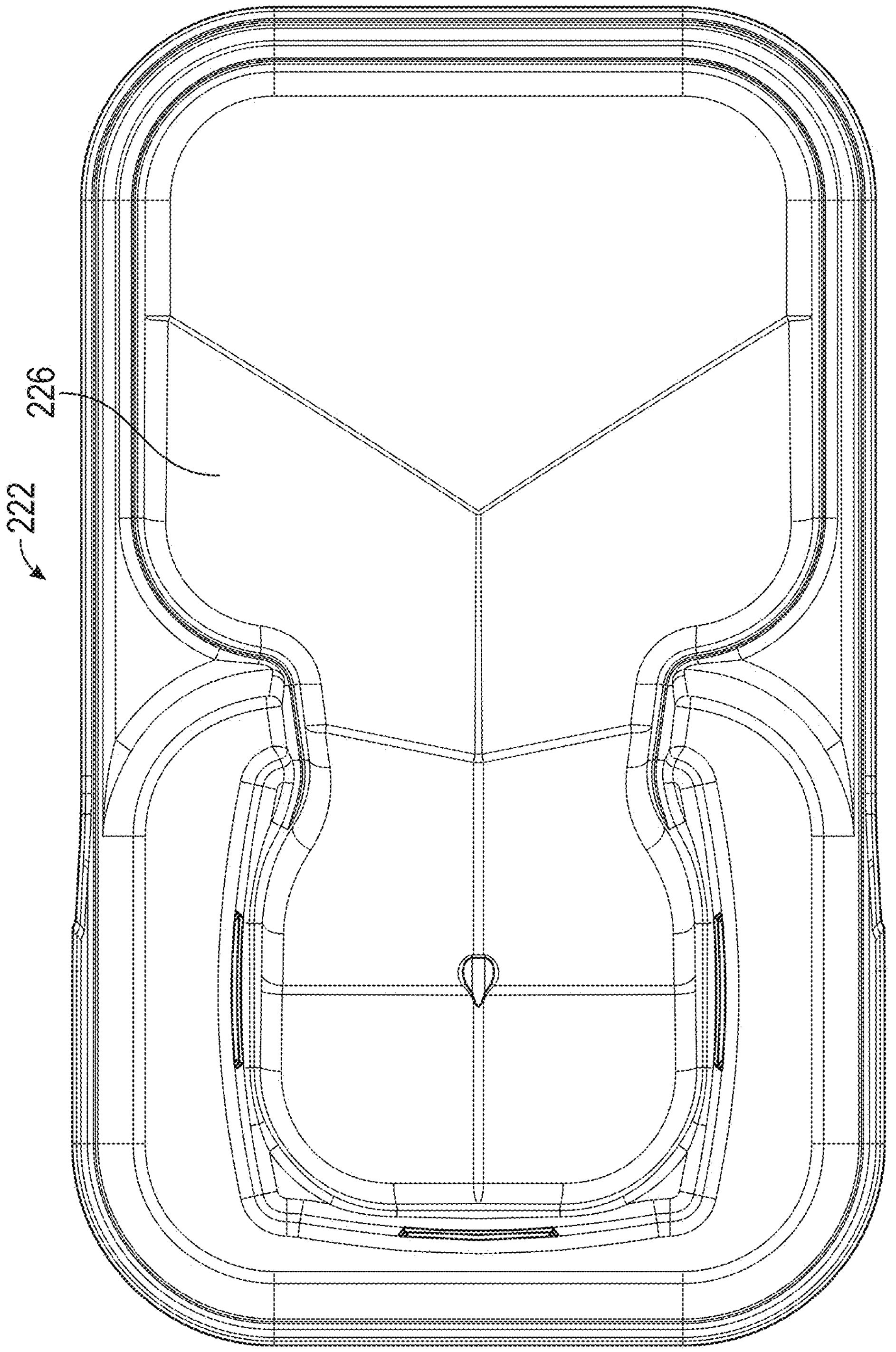
FIG. 17 is a top view of the waterer base of FIG. 12, in an example embodiment.

Referring now to FIG. 12, an alternate embodiment of a feeder and waterer assembly 216 (e.g., assembly, etc.). The assembly 216 includes a waterer 218 and a feeder 220. The waterer 218 includes a waterer base 222 and a waterer bottle 224. The waterer base 222 is configured substantially similarly to the waterer base 106 of the waterer 102. However, the waterer base 222 includes a ramp 226 that defines a V-shape, as shown in FIG. 17. The V-shape of the ramp 226 is configured to direct substances towards the bowl 120.

Figure 15:
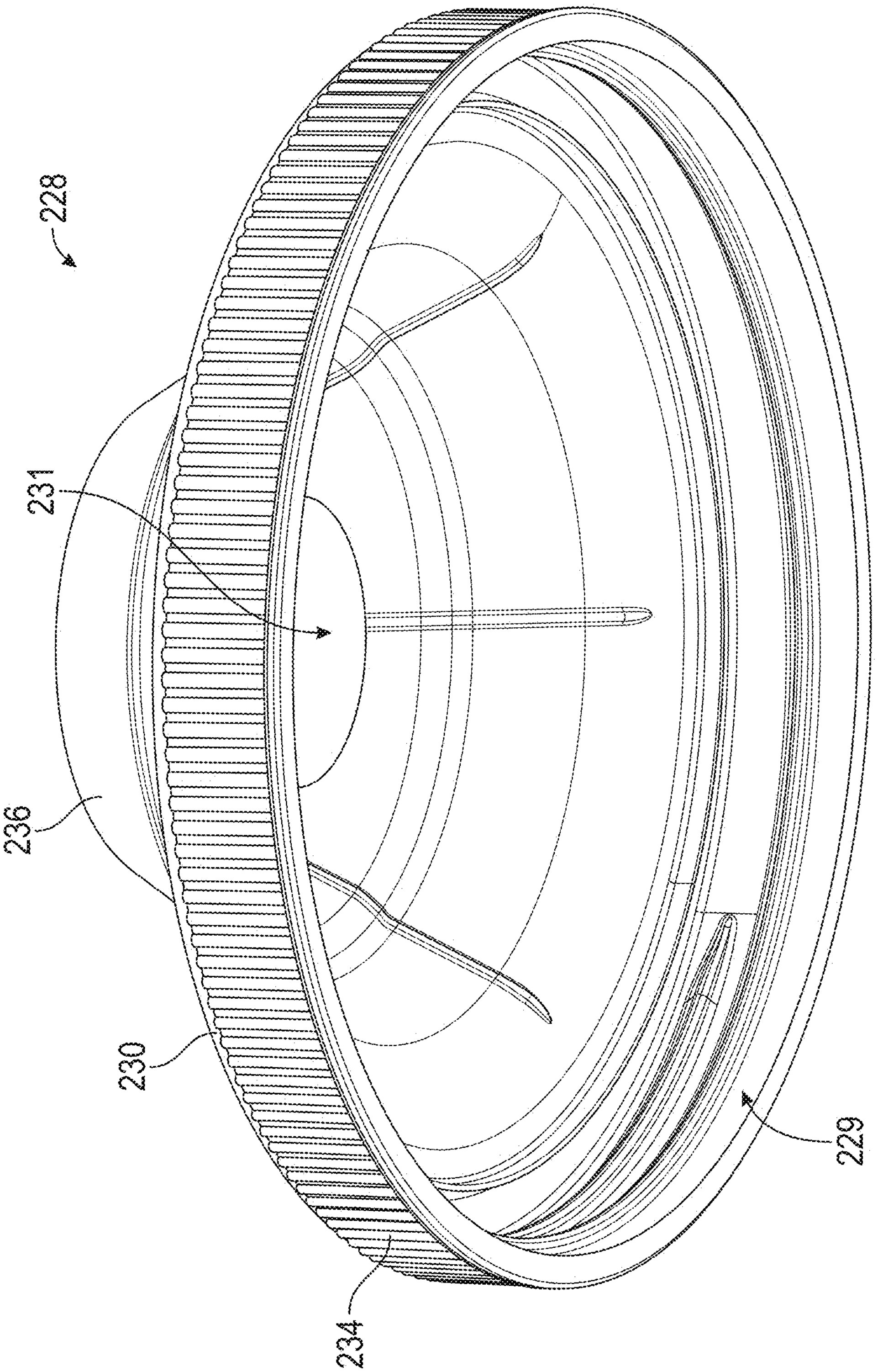
FIG. 15 is a top perspective view of the waterer cap of FIG. 12, in an example embodiment.
Figure 16:
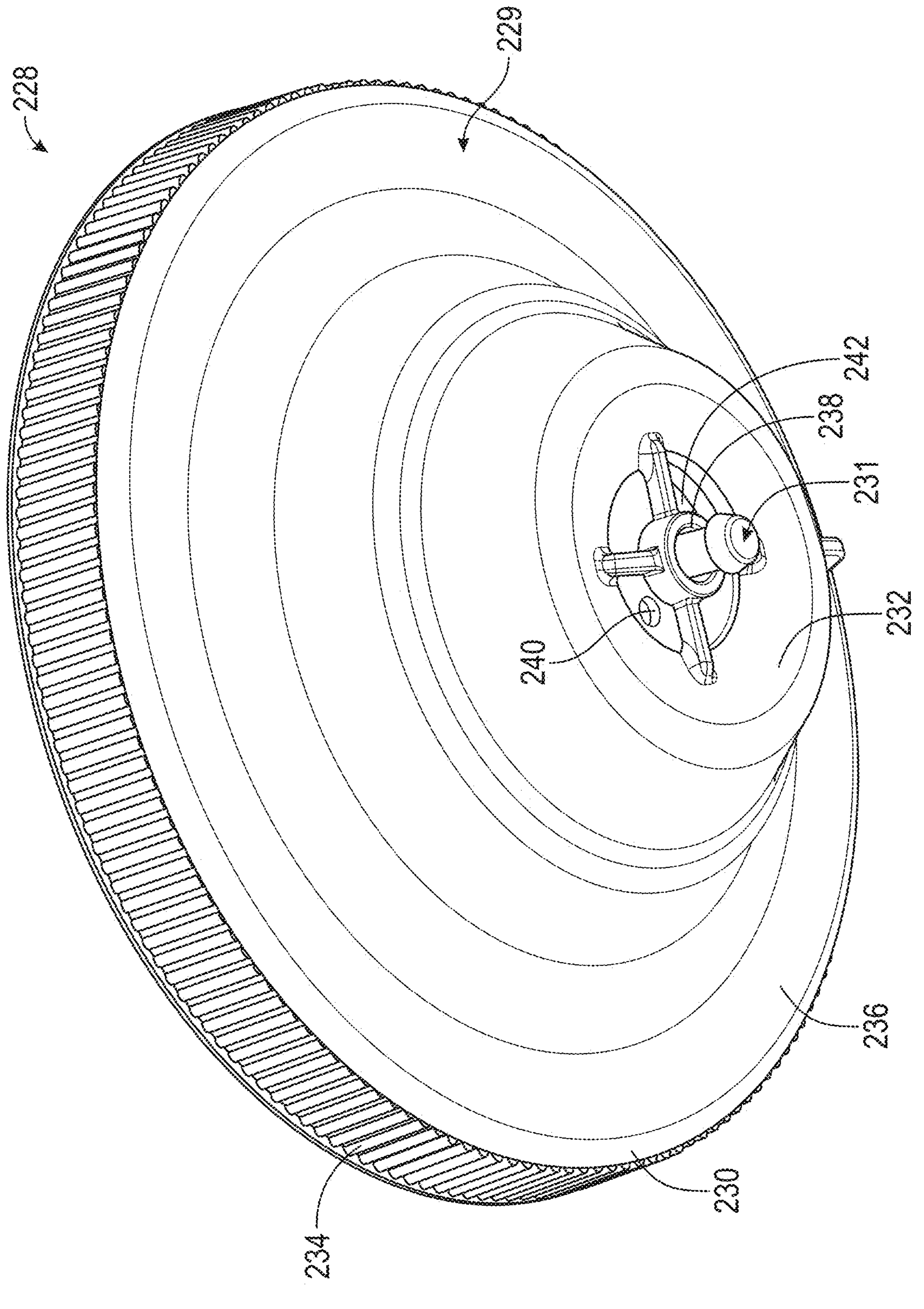
FIG. 16 is a bottom perspective view of the waterer cap of FIG. 12, in an example embodiment.

The waterer bottle 224 is configured similarly to the waterer bottle 108 of the waterer 102. However, the waterer bottle 224 includes an alternate embodiment of a waterer cap assembly 228, as shown in FIGS. 15 and 16. The waterer cap assembly 228 includes a water cap body 229 and a waterer cap plunger 231. The waterer cap plunger 231 is configured substantially similar to the waterer cap plunger 188 of the assembly 100. The water cap body 229 includes an upper base 230, a lower base 232, upward extending flange 234, and a connecting flange 236. The upward extending flange 234 extends substantially perpendicular from the upper base 230 away from the waterer base 222. The upward extending flange 234 is configured to couple to the waterer bottle 224. The lower base 232 is vertically offset from the upper base 230 and is substantially parallel to the upper base 230. The connecting flange 236 extends between the upper base 230 and the lower base 232.

The lower base 232 defines a center aperture 238, a right-side aperture 240 (e.g., a first offset aperture, a first periphery aperture, etc.), and a left side aperture 242 (e.g., a second offset aperture, a second periphery aperture, etc.). The center aperture 238 is configured to receive at least a portion of the waterer cap plunger 231. The right-side aperture 240 and the left side aperture 242 are each offset from the center aperture 238. The right-side aperture 240 defines a circular cross-sectional area and the left side aperture 242 defines a semi-circular area. Each of the right-side aperture 240 and the left side aperture 242 are configured to limit noise levels of the waterer 218 when the water flows from the waterer bottle 224 to the waterer base 222 by limiting the area the water can flow through (i.e., high surface areas of apertures enable higher volumes of water to flow and therefore more noise is produced). In the illustrated embodiment, there are two apertures. In some embodiments, there are more than two apertures (e.g., four semi-circular apertures surrounding the center aperture 238.)

Figure 13:
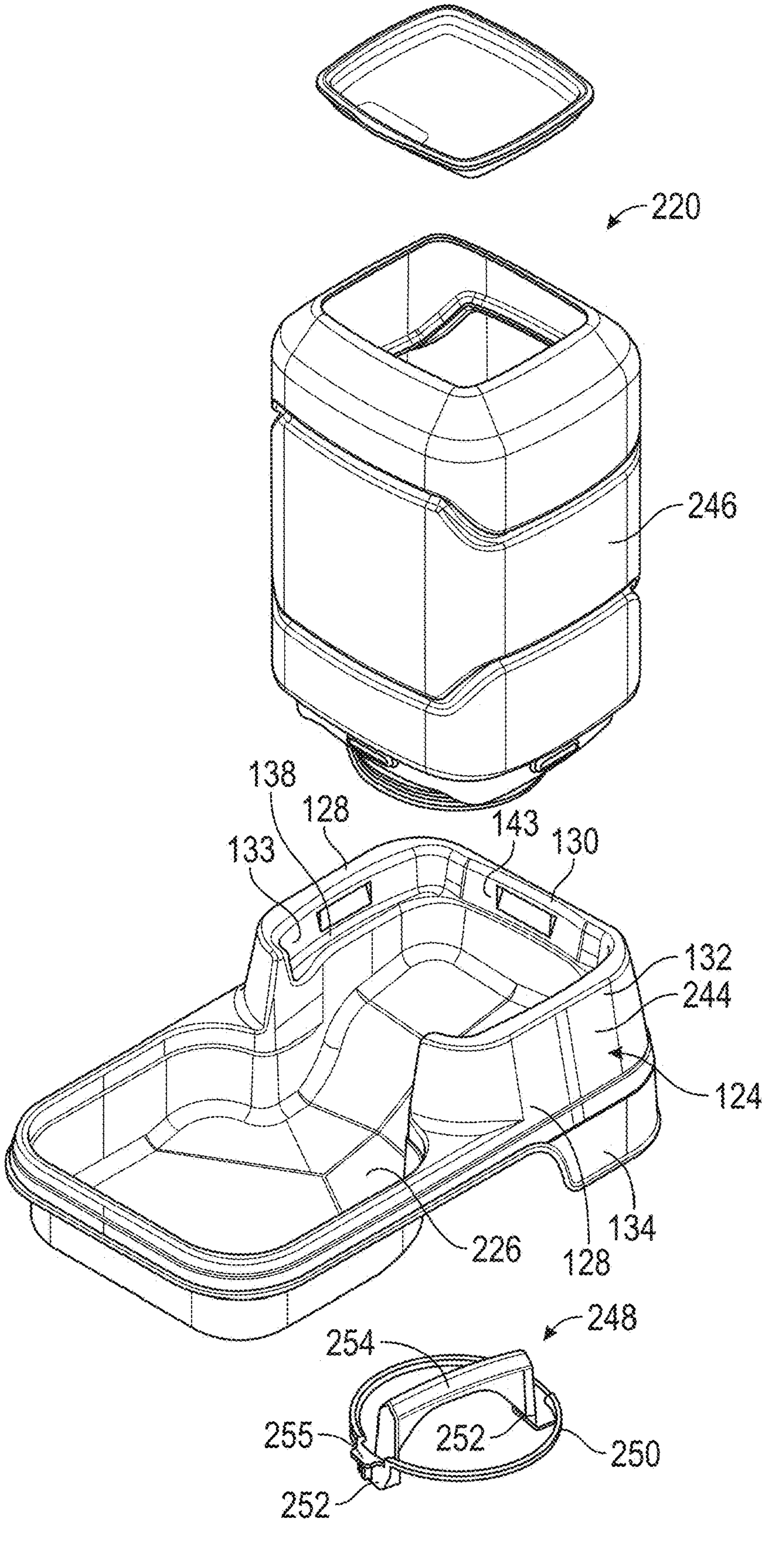
FIG. 13 is a top perspective exploded view of the feeder of FIG. 12, in an example embodiment.
Figure 14:
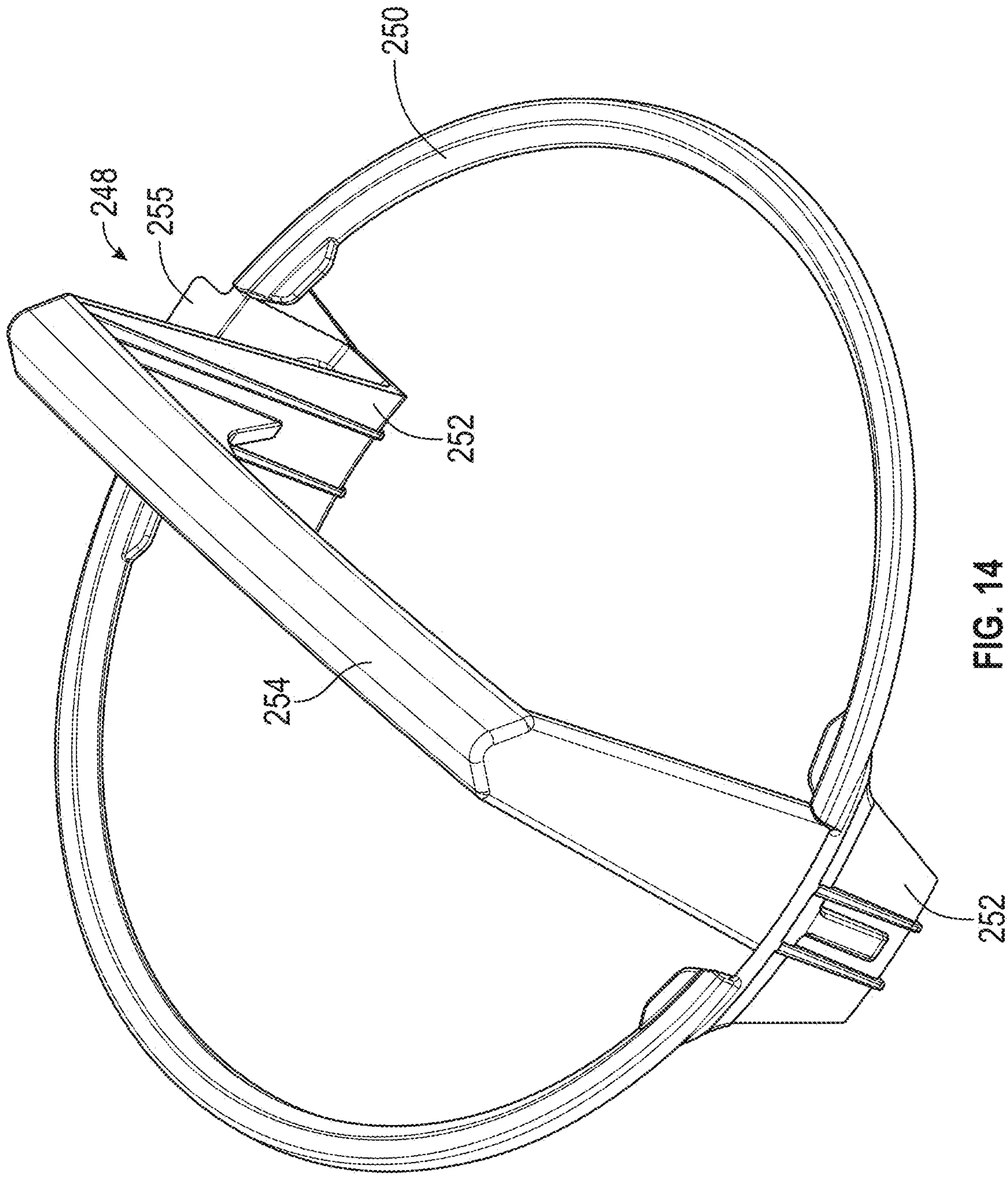
FIG. 14 is a perspective view of the ring insert of FIG. 12, in an example embodiment.

Referring now to FIGS. 13 and 14, the feeder 220 includes a feeder base 244, a feeder bottle 246, and a ring insert 248 (e.g., animal entry prevention insert, etc.). The feeder base 244 is configured substantially similar to the waterer base 222 and the feeder bottle 246 is configured substantially similar to the waterer bottle 224. The ring insert 248 is received within a lower end of the feeder bottle 246 and configured to prevent an animal from accessing the inside of the feeder bottle 246 by providing a physically barrier to entry. The ring insert 248 includes a ring 250 (e.g., a loop, a circle, etc.), a plurality of ring protrusions 252 (e.g., bottle coupling portions, etc.), a center arch 254 (e.g., a curved bar), and a front tab 255. The ring 250 is configured to couple to the lower end of the feeder bottle 246. The ring protrusions 252 each extend from the ring 250, around the lower end of the feeder bottle 246, and within the feeder bottle 246. The front tab 255 extends from the ring 250 and is configured to enable a user to grip onto and remove the ring insert 248. In the illustrated embodiment, there are two protrusions 252 on opposite sides of the ring 250 (e.g. directly across the center diameter of the ring 250). In some embodiments, there are more than two ring protrusions 252. The center arch 254 extends between each of the plurality of ring protrusions 252 and away from the ring 250 within the feeder bottle 246. The center arch 254 is curved to enable food to flow around the ring insert 248 without becoming stuck or lodged (i.e., when the center arch is flat, due to the flow path of the food the food may become lodged within the ring insert). In some embodiments, the ring insert 248 may include more than one center arch 254.

Referring now to FIG. 18, an alternate embodiment of an assembly, shown as feeder and waterer assembly 256. The assembly 256 includes a waterer 258 and a feeder 260. The waterer 258 includes a waterer base 262 and a waterer bottle 264. The waterer base 262 is configured substantially similar to the waterer base 222 of the assembly 216. The waterer bottle 264 is configured substantially similar to the waterer bottle 224 of assembly 216. However, the waterer bottle 224 includes a plurality of water bottle sides 266 that each includes an upper side indentation 268 (e.g., first groove, upper channel, etc.), a lower side indentation 270 (e.g., second groove, lower channel, etc.), and a middle side indentation 272 (e.g., third groove, center channel, etc.). The water bottle sides 266, the upper side indentation 268, and the lower side indentations 270 are configured substantially similar to the bottle sides 150, the upper side indentation 162, and the lower side indentation 164 of the waterer bottle 108. Each of the middle side indentations 272 is located between one of the upper side indentation 268 and one of the lower side indentations 270. The middle side indentation 272 extends either substantially parallel to the upper side indentation 268 and the lower side indentations 270 or substantially perpendicular to the upper side indentation 268 and the lower side indentations 270. The lower side indentations 270, the upper side indentation 268, and the middle side indentation 272 are configured to further reduce movement of the plurality of water bottle sides 266 when water flows from the waterer bottle 264 to the waterer base 262. In the illustrated embodiment, on two opposite water bottle sides 266 the middle side indentations 272 are substantially parallel to the upper side indentation 268 and the lower side indentations 270 and on two opposite water bottle sides 266 the middle side indentation 272 are substantially perpendicular to the upper side indentation 268 and the lower side indentations 270. In some embodiments, the middle side indentation 272 is angled at an acute angle with respect to the corresponding upper side indentation 268. In some embodiments, the middle side indentation 272 is angled at an obtuse angle with respect to the corresponding upper side indentation 268.

Figure 19:
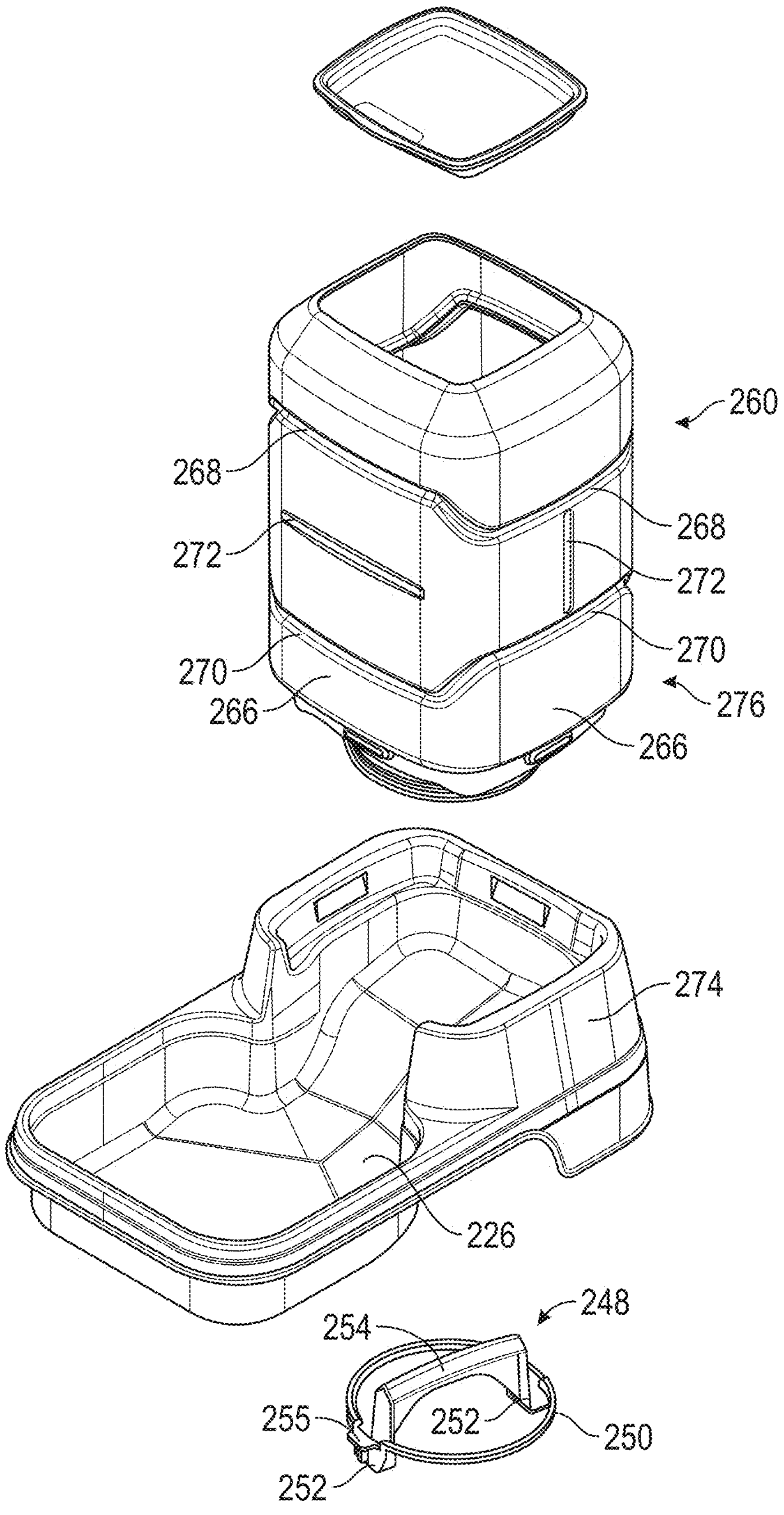
FIG. 19 is a top perspective exploded view of the feeder of FIG. 18, in an example embodiment.

Referring now to FIG. 19, the feeder 260 includes a feeder base 274 and a feeder bottle 276. The feeder base 274 is configured substantially similar to the waterer base 262. The feeder bottle 276 is configured substantially similar to the waterer bottle 264.

Figure 20:
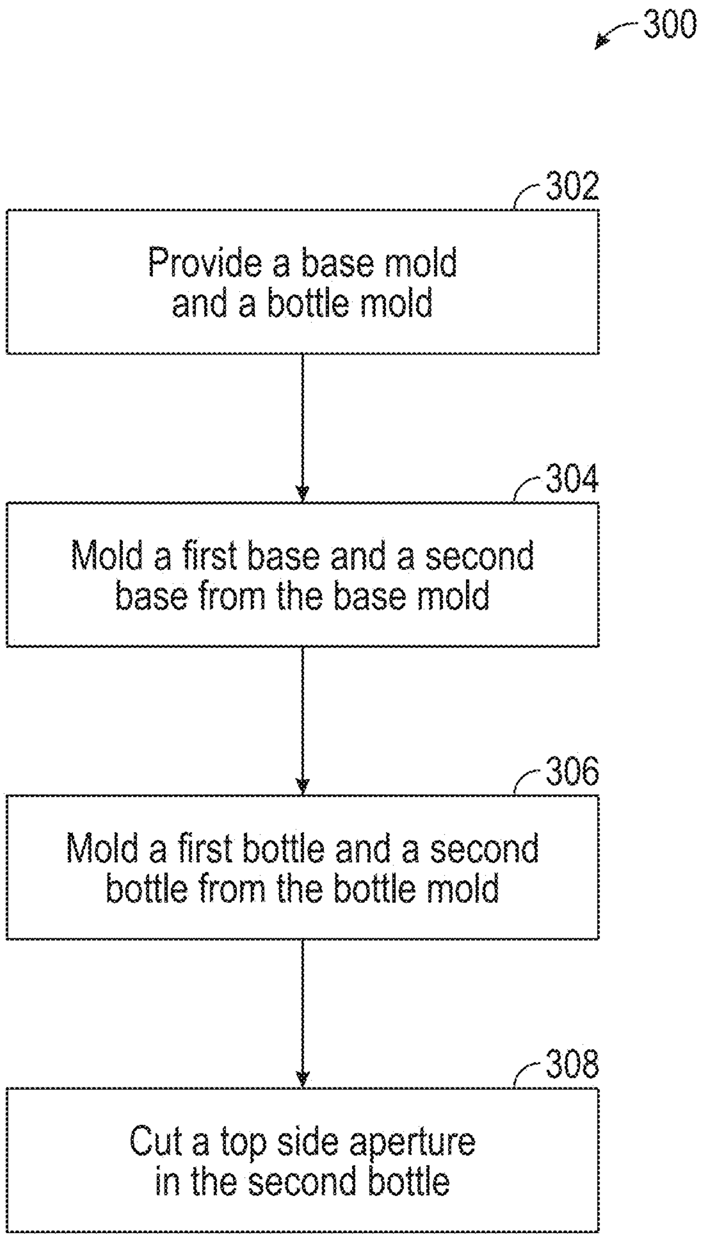
FIG. 20 is a flow diagram of a method of manufacturing a feeder and waterer.

Referring now to FIG. 20, a method 300 of manufacturing the feeder 104 and the waterer 102. At step 302, a base mold and a bottle mold are provided. At step 304, a first base and a second base are molded from the base mold. The first base is the waterer base 106 and the second base is the feeder base 202. The waterer base 106 and the feeder base 202 are identical. Using the same mold for both the waterer base 106 and the feeder base 202 significantly reduces change over time and therefore increases profit and efficiency, because only one mold is used for the waterer base 106 and the feeder base 202 versus two separate molds.

At step 306, a first bottle and a second bottle are molded from the bottle mold. The first bottle is the waterer bottle 108 and the second bottle is the feeder bottle 204. At this point in the method, the waterer bottle 108 and the feeder bottle 204 are identical. Using the same mold for both the waterer bottle 108 and the feeder bottle 204 significantly reduces change over time and therefore increases profit and efficiency, because only one mold is used for the waterer bottle 108 and the feeder bottle 204 versus two separate molds. At step 308, a top side aperture 208 is cut in the feeder bottle 204 (e.g., using laser cutting, using a CNC machine, using a hot knife cutter, using a rotary tool, etc.).

Figure 21:
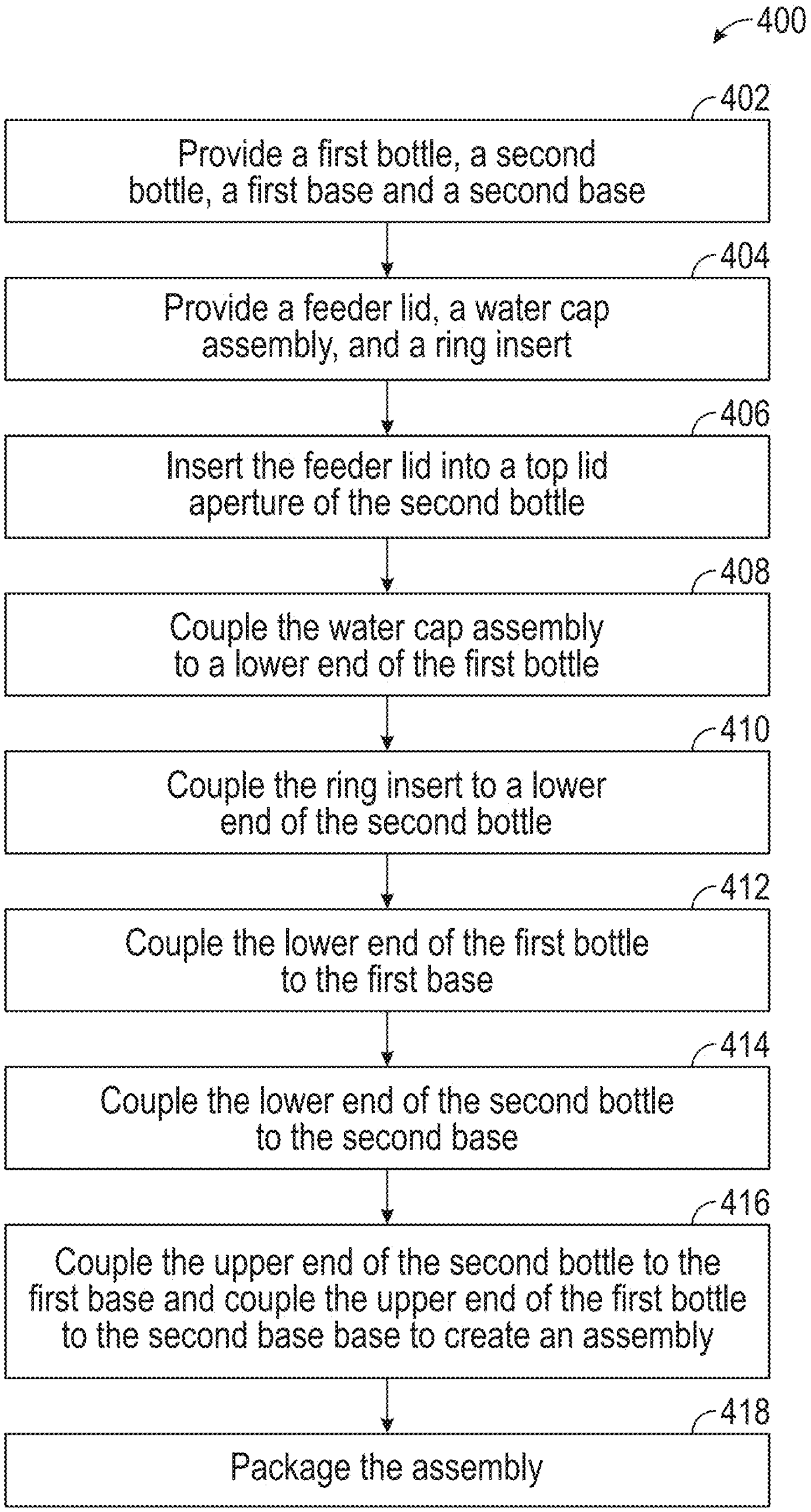
FIG. 21 is a flow diagram of a method of assembling a feeder and waterer assembly.

Referring now to FIG. 21 a method 400 of assembling the assembly 100. In step 402 a first and a second bottle and a first and a second base are provided. The first bottle is the waterer bottle 108, the second bottle is the feeder bottle 204, the first base is the waterer base 106, and the second base is the feeder base 202. At step 404, a feeder lid 206, a waterer cap assembly 110, and a ring insert 248 are provided. At step 406, the feeder lid 206 is inserted into the top side aperture 208 of the feeder bottle 204 and coupled to the feeder bottle 204. At step 408, the waterer cap assembly 110 is coupled to a lower bottle end 154 of the waterer bottle 108. At step 410, the ring insert 248 is coupled to a lower bottle end 154 of the feeder bottle 204.

At step 412, the lower end of the waterer bottle 108 is coupled to the waterer base 106. The lower end of the waterer bottle 108 is coupled to the stand 116 of the waterer base 106. At step 414, the lower end of the feeder bottle 204 is coupled to the feeder base 202. The lower end of the feeder bottle 204 is coupled to the stand 116 of the feeder base 202.

At step 416, the upper end of the feeder bottle 204 is coupled to the waterer base 106 and the upper end of the waterer bottle 108 is coupled to the feeder base 202 to create an assembly, the assembly 100. The upper end of the feeder bottle 204 is coupled to the bowl 120 of the waterer base 106. The upper end of the waterer bottle 108 is coupled to the bowl 120 of the feeder base 202. At step 418 the assembly 100 is packaged within a box for shipping.

The method 300 of FIG. 20 and the method 400 of FIG. 21 may be carried out using any of the assemblies, feeders, or waterers described herein. For example, the method 300 and the method 400 may be carried out to create the assembly 256, including the waterer 258 and the feeder 260, or the assembly 216, including the waterer 218 and the feeder 220.

III. Configuration of Example Embodiments

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof (e.g., example), as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A feeder and waterer assembly, comprising:

a feeder including:
- a feeder base; and
- a feeder bottle coupled to the feeder base, the feeder bottle configured to provide solid food to the feeder base under a force of gravity; and a waterer including:
- a waterer base, the feeder bottle coupled to the waterer base; and
- a waterer bottle coupled to the waterer base and the feeder base, the waterer bottle configured to provide water to the waterer base under a force of gravity;

wherein the waterer base and the feeder base are interchangeable and the feeder bottle and the waterer bottle are substantially similar dimensions.

2. The feeder and waterer assembly of claim 1, wherein the feeder base includes:

a feeder bowl configured to receive solid food, an upper end of the waterer bottle configured to couple to the feeder bowl in a nested configuration;

a feeder stand, a lower end of the feeder bottle coupled to the feeder stand; and a feeder ramp extending between the feeder bowl and the feeder stand.

3. The feeder and waterer assembly of claim 2, wherein the feeder ramp forms a V-shape configured to direct food from the feeder bottle to the feeder bowl.

4. The feeder and waterer assembly of claim 2, wherein the waterer base includes:
a waterer bowl configured to receive water, an upper end of the feeder bottle configured to couple to the waterer bowl in a nested configuration;
a waterer stand, a lower end of the waterer bottle coupled to the waterer stand; and
a waterer ramp extending between the waterer bowl and the waterer stand.

5. The feeder and waterer assembly of claim 4, wherein:
the feeder bottle defines a top aperture; and
the feeder includes:
a lid received within the top aperture, the lid received within the waterer bowl; and
a ring insert coupled to the lower end of the feeder bottle and received within the feeder stand.

6. The feeder and waterer assembly of claim 5, wherein the waterer bottle includes a waterer cap assembly coupled to the waterer bottle, the waterer cap assembly received within the waterer stand and configured to prevent the water from spilling from the waterer bottle when coupling the waterer bottle to the waterer base.

7. The feeder and waterer assembly of claim 4, wherein a dimension of the feeder bowl and a dimension of the waterer bowl are substantially similar, a dimensions of the feeder stand and a dimension of the waterer stand are substantially similar, and a dimension of the feeder ramp and a dimension of the waterer ramp are substantially similar.

8. The feeder and waterer assembly of claim 1, wherein each of the feeder bottle and the waterer bottle includes:
a plurality of bottle sides, each of the bottle sides including:
an upper side indentation; and
a lower side indentation substantially parallel to the upper side indentation;
wherein the upper side indentation and the lower side indentation of the waterer bottle are configured to reduce movement of the bottle sides when water is dispensed from the waterer bottle into the waterer base.

9. The feeder and waterer assembly of claim 8, wherein each of the feeder bottle and the waterer bottle includes a middle side indentation between the upper side indentation and the lower side indentation, wherein the middle side indentation extends substantially perpendicular to or parallel to the upper side indentation and the lower side indentation.

10. The feeder and waterer assembly of claim 9, wherein each of the feeder bottle and the waterer bottle includes:
a plurality of corners, each of the corners extending between adjacent bottle sides, each of the corners including:
an upper corner indentation extending between adjacent upper side indentations; and
a lower corner indentation extending between adjacent lower side indentations;
wherein each of the upper corner indentations and the lower corner indentations are curved.

11. The feeder and waterer assembly of claim 1, wherein:
the feeder bottle defines a top aperture; and
the feeder includes a lid received within the top aperture, the lid including:
a lid base;
a plurality of lid flanges extending from a periphery of the lid base and coupled to the feeder bottle; and
a lid tab extending from one of the lid flanges, the lid tab substantially parallel to the lid base and configured to provide a grip surface for a user.

12. The feeder and waterer assembly of claim 1, wherein:
the feeder bottle defines a bottom aperture; and
the feeder includes a ring insert at least partially received within the bottom aperture, the ring insert including:
a ring coupled to the feeder bottle;
a curved bar extending within the feeder bottle; and
a plurality of ring protrusions extending between the ring and the curved bar.

13. The feeder and waterer assembly of claim 1, wherein the waterer includes a waterer cap assembly including:
a waterer cap body coupled to the waterer bottle; and
a waterer cap plunger received within the waterer cap body, the waterer cap plunger including:
a plunger base received within the waterer bottle;
a plunger rod extending from the plunger base and through the waterer cap body; and
a plunger tip coupled to the plunger rod, the plunger tip configured to contact a portion of the waterer base.

14. The feeder and waterer assembly of claim 13, wherein the waterer cap body includes:
an upward cap base;
an upward cap flange extending from the upward cap base and coupled to the waterer bottle;
a lower cap base offset from the upward cap base, the lower cap base defining:
a center cap aperture configured to receive the plunger rod; and
a periphery cap aperture offset from the center cap aperture; and
a lower cap flange extending between the upward cap base and the lower cap base;
wherein the periphery cap aperture is configured to reduce noise when water is dispensed from the waterer bottle into the waterer base.

15. The feeder and waterer assembly of claim 1, wherein:
each of the feeder base and the waterer base includes a plurality of stand side walls, and each of the stand side walls defines a wall aperture;
each of the feeder bottle and the waterer bottle includes a plurality of side bottle walls, and each of the side bottle walls includes a protrusion; and
each of the wall apertures is configured to receive one of the protrusions to provide a snap-fit between the feeder base and the feeder bottle and the between the waterer base and the waterer bottle.

16. A feeder and waterer assembly, comprising:
a base including:
a bowl;
a stand; and
a ramp extending between the bowl and the stand;
a waterer bottle, a lower end of the waterer bottle dimensioned to couple to the stand, the waterer bottle configured to provide water into the bowl under a gravitational force; and
a feeder bottle, a lower end of the feeder bottle dimensioned to couple to the stand, an upper end of the feeder bottle including a lid, the feeder bottle configured to provide solid food into the bowl under a gravitational force;
wherein the upper end of the feeder bottle and an upper end of the waterer bottle have substantially similar dimensions, such that each of the upper ends of the waterer bottle and the feeder bottle are configured to be received within the bowl.

17. The feeder and waterer assembly of claim 16, wherein each of the feeder bottle and the waterer bottle includes:

a plurality of bottle sides extending between the lower end and the upper end of the respective waterer bottle or feeder bottle, each of the bottle sides including:

an upper side indentation; and a lower side indentation substantially parallel to the upper side indentation;

wherein the upper side indentation and the lower side indentation of the waterer bottle are configured to reduce movement of the bottle sides when the water is dispensed.

18. The feeder and waterer assembly of claim 17, wherein each of the feeder bottle and the waterer bottle includes a middle side indentation between the upper side indentation and the lower side indentation, wherein the middle side indentation extends substantially perpendicular to or parallel to the upper side indentation and the lower side indentation.

19. A feeder and waterer assembly comprising:

a feeder base and a waterer base, the feeder base and the waterer base substantially identical, each of the feeder base and the waterer base including:

a stand;

a bowl; and a ramp extending between the stand and the bowl, the ramp configured to direct food or water from the stand to the bowl;

a waterer bottle and a feeder bottle, the feeder bottle substantially identical to the waterer bottle, the waterer bottle configured to provide water to the bowl of the waterer base under a gravitational force, the feeder bottle configured to provide solid food to the bowl of the feeder base under a gravitational force, each of the waterer bottle and the feeder bottle including:

an upper end;

a lower end opposite the upper end; and a plurality of bottle sides extending between the upper end and the lower end of the respective bottle, each of the bottle sides defining:

an upper indentation; and a lower indentation substantially parallel to and offset from the upper indentation, the upper indentation and the lower indentation configured to reduce movement of the bottle sides when the water is dispensed; and wherein the upper end of the feeder bottle includes a lid, the lower end of the feeder bottle includes a ring insert at least partially extending within the feeder bottle, and the lower end of the waterer bottle includes a waterer cap assembly configured to prevent the water from spilling from the waterer bottle when coupling the waterer bottle to the waterer base;

wherein the upper ends of the feeder bottle and the waterer bottle are dimensioned to couple interchangeably with the bowl of the feeder base or the bowl of the waterer base and the lower ends of the feeder bottle and the waterer bottle are dimensioned to couple interchangeably with the stand of the feeder base or the stand of the waterer base.

20. The feeder and waterer assembly of claim 19, wherein the waterer cap assembly includes:

a waterer cap plunger; and a waterer cap body coupled to the waterer bottle, the waterer cap body including:

an upper cap base;

an upper cap flange extending from the upper cap base and coupled to the waterer bottle;

a lower cap base offset from the upper cap base, the lower cap base defining:

a center cap aperture configured to receive a portion of the waterer cap plunger; and a periphery cap aperture offset from the center cap aperture; and a lower cap flange extending between the upper cap base and the lower cap base;

wherein the periphery cap aperture is configured to reduce noise when water is dispensed from the waterer bottle into the waterer base.

* * * * *